US012384579B2

(12) United States Patent
Frederick et al.

(10) Patent No.: US 12,384,579 B2
(45) Date of Patent: Aug. 12, 2025

(54) SYSTEM AND PROCESS FOR FORMING RETAINED CONTAINER GROUPS FROM ARRAYED CONTAINER GROUPS

(71) Applicant: Douglas Machine Inc., Alexandria, MN (US)

(72) Inventors: Aaron M. Frederick, Alexandria, MN (US); Kasey W. Dillon, Alexandria, MN (US); Rick W. Lukanen, Jr., Alexandria, MN (US); Craig Sholts, Alexandria, MN (US); Jeffery L. Lenarz, Garfield, MN (US); Matthew R. Crissinger, Nelson, MN (US); Andrew J. Bye, Alexandria, MN (US); Eric A. Timmerman, Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 18/441,914

(22) Filed: Feb. 14, 2024

(65) Prior Publication Data
US 2024/0270420 A1    Aug. 15, 2024

Related U.S. Application Data

(63) Continuation of application No. 17/719,794, filed on Apr. 13, 2022, now Pat. No. 11,905,052.
(Continued)

(51) Int. Cl.
B65B 61/00    (2006.01)
B65B 17/02    (2006.01)
(Continued)

(52) U.S. Cl.
CPC ............ B65B 27/04 (2013.01); B65B 17/025 (2013.01); B65B 35/44 (2013.01); B65B 41/18 (2013.01);
(Continued)

(58) Field of Classification Search
USPC .......................................... 53/398
See application file for complete search history.

(56) References Cited

U.S. PATENT DOCUMENTS 2,936,070 A    5/1960  Poupitch
3,032,944 A    5/1962  Hull et al.
(Continued)

FOREIGN PATENT DOCUMENTS

CA    3138912 A1    11/2020
DE    2624772 A1    2/1977
(Continued)

OTHER PUBLICATIONS

German search report for DE102019113176.6 dated Feb. 12, 2020; 5 pages.
(Continued)

Primary Examiner — Chinyere J Rushing-Tucker
(74) Attorney, Agent, or Firm — Dicke, Billig & Czaja, PLLC

(57) ABSTRACT

A system for forming retained container groups from an arrayed container group (ACG) via application of an adapted retainer blank to the ACG is generally provided. The system is advantageously characterized by a container conveyance apparatus for conveying arrayed container groups, a supply of retainer blanks from which retainer blanks are dispensable, and a processing station characterized by a segment of the container conveyance apparatus, a die block, for receipt of a dispensed retainer blank from the supply of retainer blanks, and a robotic arm equipped with an end of arm tool
(Continued)

(EOAT). The robotic arm is operable so as to selectively position the EOAT within the processing station, the EOAT positionable for urged engagement of a dispensed retainer blank received upon the die block so as to form and secure an adapted retainer blank, the robotic arm thereafter positionable to register the secured adapted retainer blank with a conveyed ACG conveyed on the segment of the container conveyance apparatus of the processing station, the robotic arm further positionable to apply the secured adapted retainer blank to the registered conveyed ACG to thereby form at least two retained container group packs from the registered conveyed ACG.

32 Claims, 24 Drawing Sheets

Related U.S. Application Data

(60) Provisional application No. 63/232,333, filed on Aug. 12, 2021, provisional application No. 63/174,239, filed on Apr. 13, 2021.

(51) Int. Cl.
    *B65B 27/04*     (2006.01)
    *B65B 35/44*     (2006.01)
    *B65B 41/18*     (2006.01)
    *B65G 61/00*     (2006.01)

(52) U.S. Cl.
    CPC ...... *B65G 61/00* (2013.01); *B65G 2201/0235* (2013.01)

(56) References Cited

U.S. PATENT DOCUMENTS

| | | |
|---|---|---|
| 3,137,109 A | 6/1964 | Rapata |
| 3,407,563 A | 10/1968 | Dieter et al. |
| 3,509,684 A | 5/1970 | Hohl et al. |
| 3,742,677 A | 7/1973 | Best |
| 4,116,331 A | 9/1978 | Curry et al. |
| 4,805,372 A | 2/1989 | Nigrelli |
| 4,817,361 A | 4/1989 | Cunningham |
| 4,953,342 A | 9/1990 | Hynes |
| 5,088,269 A | 2/1992 | Thelen |
| 5,117,609 A | 6/1992 | Seymour et al. |
| 5,125,506 A | 6/1992 | Galbierz et al. |
| 5,359,830 A | 11/1994 | Olson et al. |
| 6,843,360 B2 | 1/2005 | Peterman et al. |
| 8,112,970 B2 | 2/2012 | Marco et al. |
| 8,448,411 B2 | 5/2013 | Huber et al. |
| 11,390,405 B2 | 7/2022 | Spindler et al. |
| 2011/0030311 A1 | 2/2011 | Martini |
| 2017/0190488 A1 | 7/2017 | Bates |
| 2018/0362234 A1 | 12/2018 | L'Heureux et al. |
| 2019/0092503 A1 | 3/2019 | Daniel et al. |
| 2019/0119019 A1 | 4/2019 | Patton |
| 2020/0361645 A1 | 11/2020 | Spindler et al. |
| 2022/0234768 A1* | 7/2022 | Luber ................... B65B 17/025 |

FOREIGN PATENT DOCUMENTS

| | | |
|---|---|---|
| DE | 3046423 A1 | 7/1982 |
| DE | 102009026220 A1 | 1/2011 |
| DE | 102013113754 A1 | 6/2015 |
| DE | 202018106535 U1 | 2/2019 |
| DE | 102019113176 A1 | 11/2020 |
| DE | 102019113179 A1 | 11/2020 |
| DE | 102019128874 A1 | 4/2021 |
| DE | 102019135254 A1 | 6/2021 |
| EP | 1075419 B1 | 10/2003 |
| WO | 9511174 A1 | 4/1995 |
| WO | 9906280 A1 | 2/1999 |
| WO | 2009097546 A1 | 8/2009 |
| WO | 2016001619 A1 | 1/2016 |
| WO | 2017041007 A1 | 3/2017 |
| WO | 2019162548 A2 | 8/2019 |
| WO | 2020233942 A1 | 11/2020 |
| WO | 2020233943 A1 | 11/2020 |

OTHER PUBLICATIONS

German search report for DE102019128874.6 dated Aug. 12, 2020; 8 pages.
German search report for DE102019135254.1 dated Aug. 24, 2020; 8 pages.
International Search Report for PCT/EP2020/061559 dated Aug. 28, 2020; Paul Faux; 11 pages.
International Search Report for PCT/EP2020/061561 dated Jul. 21, 2020; Ralph Gruber; 11 pages.
International Preliminary Report on Patentability for PCT/EP2020/061559 dated Dec. 2, 2021; Agnes Wittmann-Regis; 13 pages.
International Preliminary Report on Patentability for PCT/EP2020/061561 dated Dec. 2, 2021; Agnes Wittmann-Regis; 13 pages.

* cited by examiner

SYSTEM AND PROCESS FOR FORMING RETAINED CONTAINER GROUPS FROM ARRAYED CONTAINER GROUPS

This is a United States patent application filed pursuant to 35 USC § 111(a) claiming priority under 35 U.S.C. § 120 to U.S. Pat. Appl. Ser. No. 63/174,239 filed Apr. 13, 2021 pursuant to 35 U.S.C. § 111(b) and U.S. Pat. Appl. Ser. No. 63/232,333 filed Aug. 12, 2021 pursuant to 35 U.S.C. § 111(b), each entitled EQUIPPING AN ARRAYED CONTAINER GROUP WITH A CONTAINER CARRYING DEVICE, said applications incorporated herein by reference in their entireties.

TECHNICAL FIELD

The present disclosure is generally directed to one or more of processes, systems, stations, apparatuses, devices, assemblies, subassemblies, and/or methods for/of one or more of executing operations upon an arrayed article (e.g., container) group retainer blank and/or applying the operated upon (i.e., manipulated) retainer blank to an arrayed article group, more particularly, applying manipulated retainer blanks to arrayed container groups during processing operations whereby containers are aggregated and/or grouped in furtherance of forming retained container groups (i.e., packs) from arrayed container groups using "clip" carriers.

BACKGROUND OF THE INVENTION

In a typical packing operation, articles (i.e., "products") approach a case packing station or the like via a flowing article stream (e.g., a continuous, semi-continuous, or batch continuous stream having origins in an upstream bulk flow of articles). As such operations/processing lines are more often than not intended to aggregate articles in multiples in furtherance of establishing a multi-pack of arrayed articles, e.g., multi-pack cases (e.g., 6, 12, 24 article packs or bundles), stacked trays of arrayed articles, etc., it is necessary to manage, prepare and generally manipulate the inflow stream of articles so as to separate the articles into arrayed groups (i.e., collated arrayed articles corresponding to a preselect pack pattern consistent with the case packing objective) as is generally well known. Once grouped or collated, the article group or set may be further processed, such as by being trayed, cased or sleeved, and/or film over-wrapped. Notionally, article metering, article separation and collation, and arrayed article group loading (e.g., case or carton loading) are requisite steps attendant to a majority of article packaging operations.

In light of sustainability objectives, considerable ground has been covered in relation to how consumer goods are packaged and presented, with the beverage industry being a key player. While cartoning and sleeving remain important packaging options for larger or bulkier container arrays, renewed focus has targeted smaller container groups, for example and without limitation, 4, 6, & 8 container (e.g., beverage) packs.

Though greatly diminished since their heyday, plastic 6-pack yokes nonetheless remain in a number of forms. That said, considerable efforts have been directed to securing container groups in novel ways. For example, and without limitation, adapted containers per se which are joinable as a stack, use of adhesives which connect containers of arrayed container groups, and use of arrayed container retainers, often in the form of carrying devices or articles (i.e., clips, top clips), which are applied to an upper or top portion of an arrayed container group (ACG) so as to securely integrate the containers of the group for easy, efficient and reliable consumer handling, are known.

With regard to the container carrying devices, numerous styles have emerged and are emerging. Notionally, an apertured 2D panel, or panel portion(s) of a more robust structure, is urgingly applied to a top/upper portion of a presented ACG. For the sake of illustration only, attention is directed to the teaching of US publ. no. US 2018/0362234 (L'Heureux et al.) and WIPO publ. no. WO2019/162548 (Berga Ferres), each of which are incorporated herein by reference in its entirety. Moreover, such arrayed container retainers are known to be numerous in style, with "simple" retainers adapted to include tabs/flaps, which include branding or other product or product related messaging, which serve a banner function (see e.g., the fiber-based ACG retainer offerings of WestRock, Atlanta, GA, USA, https://www.westrock.com/products/folding-cartons/cancollar).

In-as-much as the application of retainers to groups/arrays of containers is an area ripe for improvement or further development, the carrying device per se is presently subject of much scrutiny, with work ongoing to improve such device, one facet being the automated formation of individual carrying devices from a retainer or carrying device blank as a preliminary or initial step in the application of the carrying device or devices to the ACG so as to form multiple retained article groups or packs from the ACG. It is in respect of this field of endeavor that Applicant's efforts have been directed.

In light of the foregoing, it is believed desirable and advantageous to provide one or more of processes, methods, systems, stations, apparatuses, devices, assemblies and/or subassemblies to form retained container groups from ACGs via processing a retainer blank via a die set in advance of applying the processed retainer blank to the ACG to effectively form retained article group packs in relation to the ACG. Such approach is believed to be an advancement in the art, yielding a highly automated, minimal footprint processing station whereby increased processing throughputs are achieved, with essential process steps retained while eliminating pieces and parts from heretofore know systems.

SUMMARY OF THE INVENTION

A system, and attendant process for forming retained container groups from an arrayed container group (ACG) via application of an adapted retainer blank to the ACG is generally provided. The system is advantageously characterized by a container conveyance apparatus for conveying arrayed container groups, a supply of retainer blanks from which retainer blanks are dispensable, dispensed retainer blanks operated upon to form adapted retainer blanks (e.g., and without limitation, at least a portion of the adapted retainer blank is characterized by one or more of a division, a separation, a fold, and/or a bend), adapted retainer blanks thereafter applied to arrayed container groups, and a processing station characterized by a segment of the container conveyance apparatus, a die block for receipt of a dispensed retainer blank from the supply of retainer blanks, and a robotic arm equipped with an end of arm tool (EOAT). The robotic arm is operable so as to selectively position the EOAT within the processing station, the EOAT positionable for urged engagement with a dispensed retainer blank received upon the die block so as to form and secure an adapted retainer blank, the robotic arm thereafter positionable to register the secured adapted retainer blank with an ACG conveyed on the segment of the container conveyance apparatus of the processing station, the robotic arm further positionable to apply the secured adapted retainer blank to the registered ACG to thereby form at least two retained container group packs from the registered ACG.

A process or method for forming retained container groups from an arrayed container group via application of an adapted retainer blank to the arrayed container group is likewise contemplated. For example, and without limitation, a retainer blank is received at a pre-break area of a processing station characterized by an inflow of spaced apart arrayed container groups, the pre-break area delimited by a die block. A press stoke is effectuated for an end of arm tool carried by a robotic arm so as to registeringly mate and operatively engage the die block, a received retainer blank thereby interposed between the end of arm tool and the die block. The retainer blank is divided via the press stroke so as to delimit pack carriers, and, the divided retainer blank is applied or affixed to an arrayed container group of the spaced apart arrayed contained group in furtherance of establishing container group packs from the arrayed article group characterized by each of the pack carriers. More specific features and advantages obtained in view of the summarized features will become apparent with reference to the drawing figures and DETAILED DESCRIPTION OF THE INVENTION.

BRIEF DESCRIPTION OF THE DRAWINGS & DEPICTIONS THEREOF

All figures have been prepared, and are included to facilitate and/or enhance an understanding of the basic teachings of the contemplated embodiments, and/or the concepts underlying same, and are incorporated in and constitute a part of this specification. While the drawings notionally illustrate embodiments and context with respect thereto, and together with the description serve to explain principles of embodiments, other embodiments and many of the intended advantages of the disclosed systems, subsystems, processing stations/areas, assemblies, subassemblies, apparatus, devices, mechanisms, processes, methods, etc. will be readily appreciated as they become better understood by reference to the following detailed description and figures. It is to be noted, as circumstances warrant, that the elements of the drawings are not necessarily to scale relative to each other, with like reference numerals designating corresponding similar parts/structures.

FIGS. 1-34 are provided herein wherein:

FIG. 1 depicts, "rear" elevation, slightly from above and process flow left to right, an advantageous, non-limiting continuous motion processing system for forming retained container groups from an arrayed container group via application of an adapted retainer blank (i.e., flat clip stock) to the arrayed container group;

Figure 1:
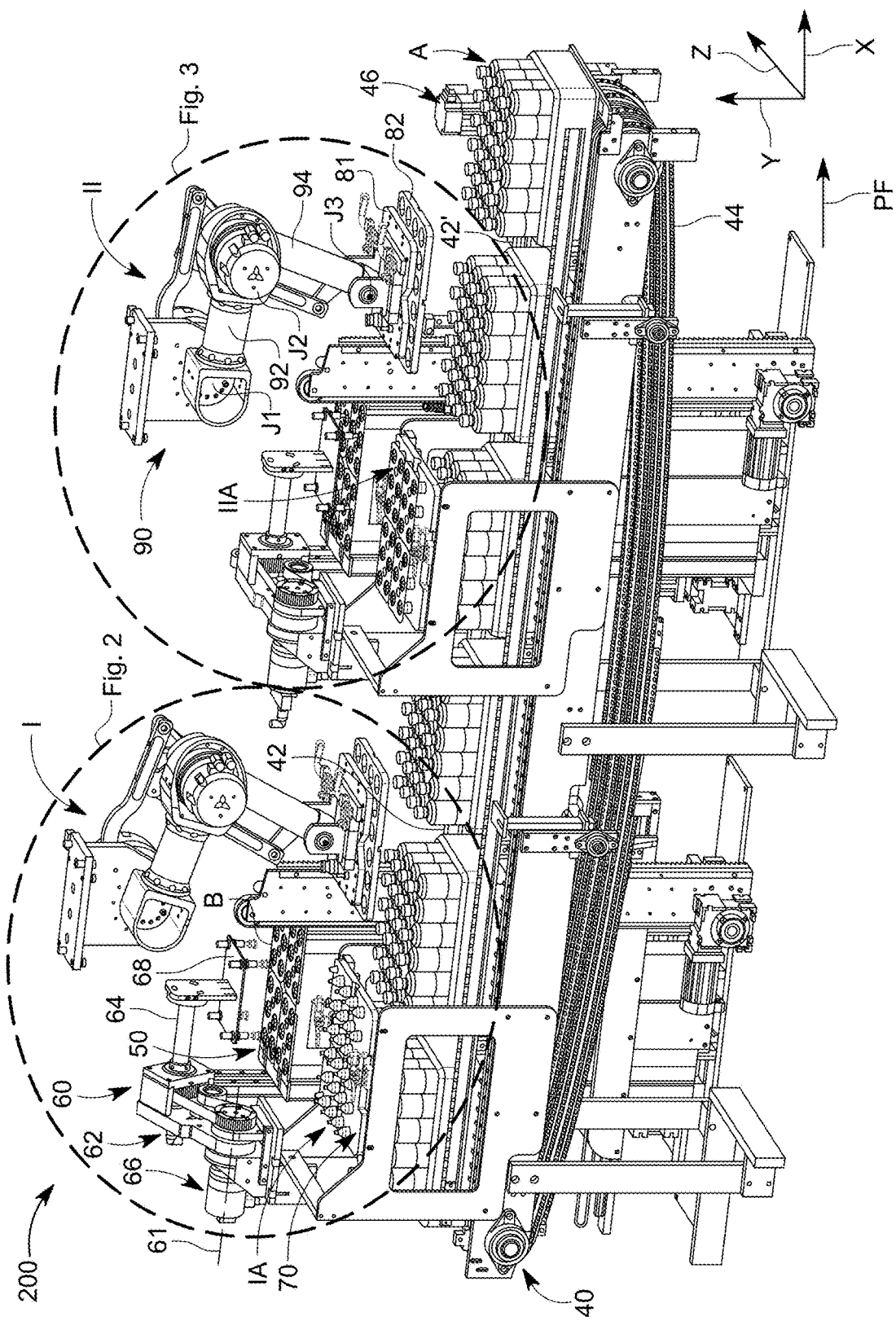
Figure 2:
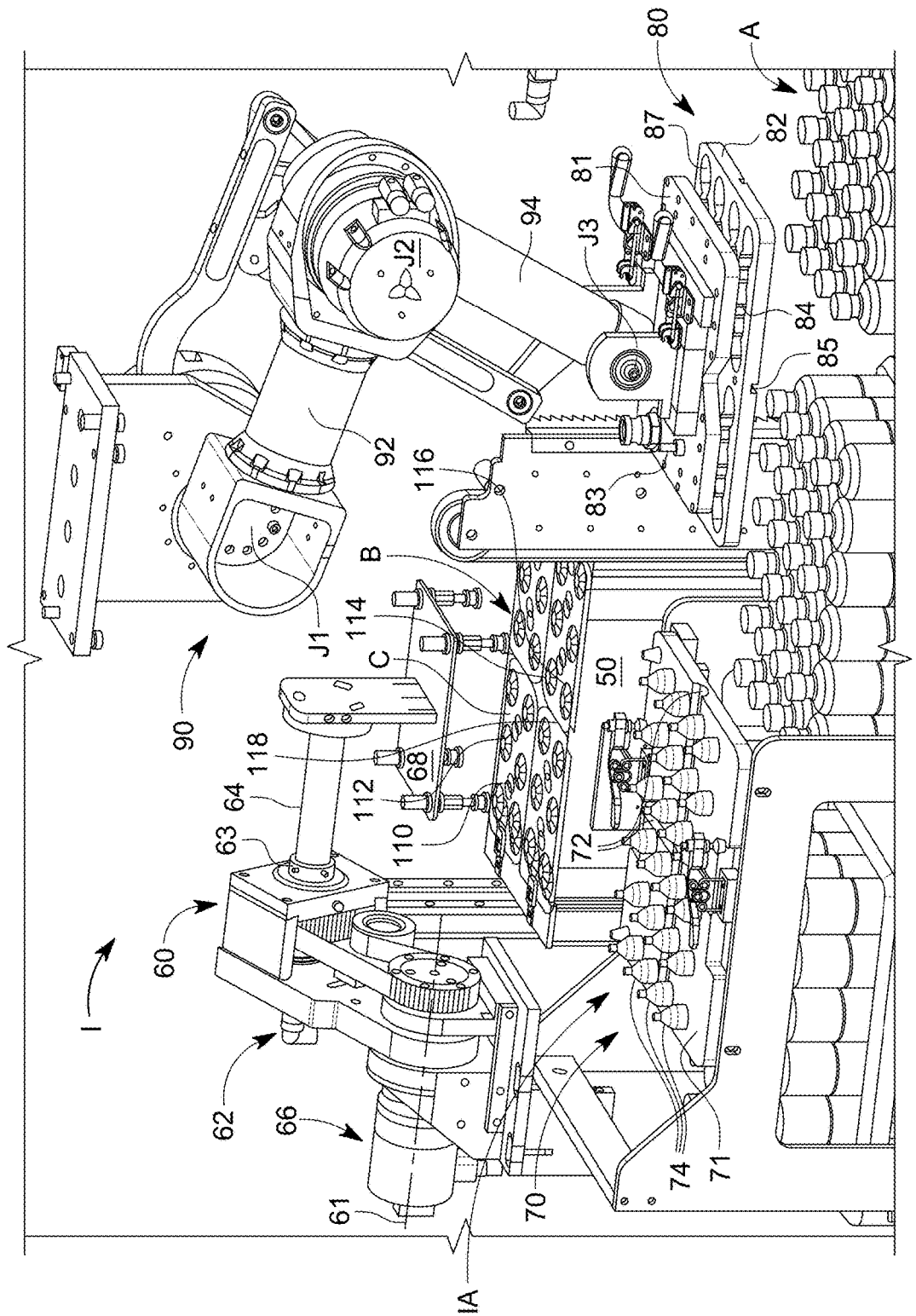
Figure 3:
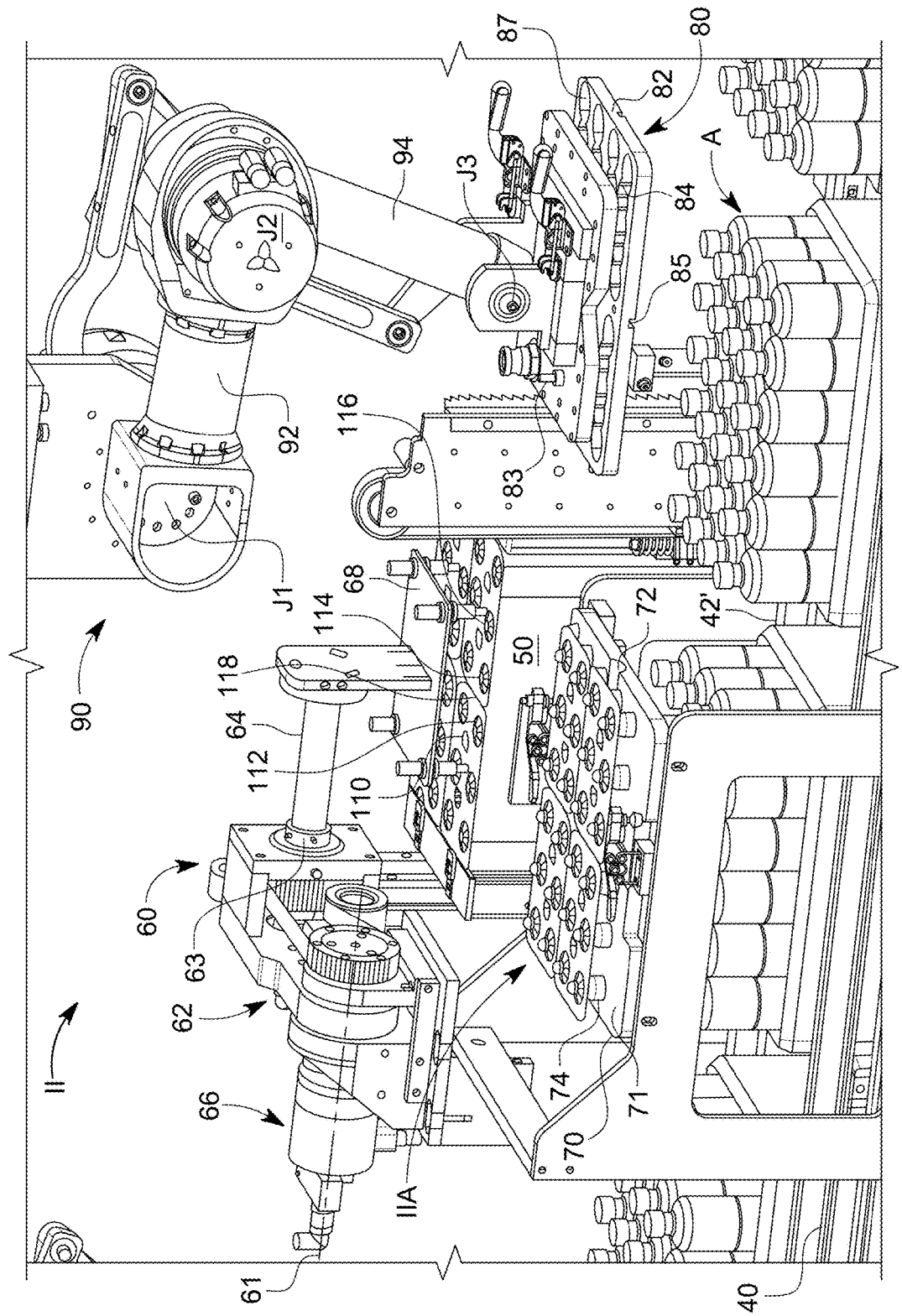
Figure 4:
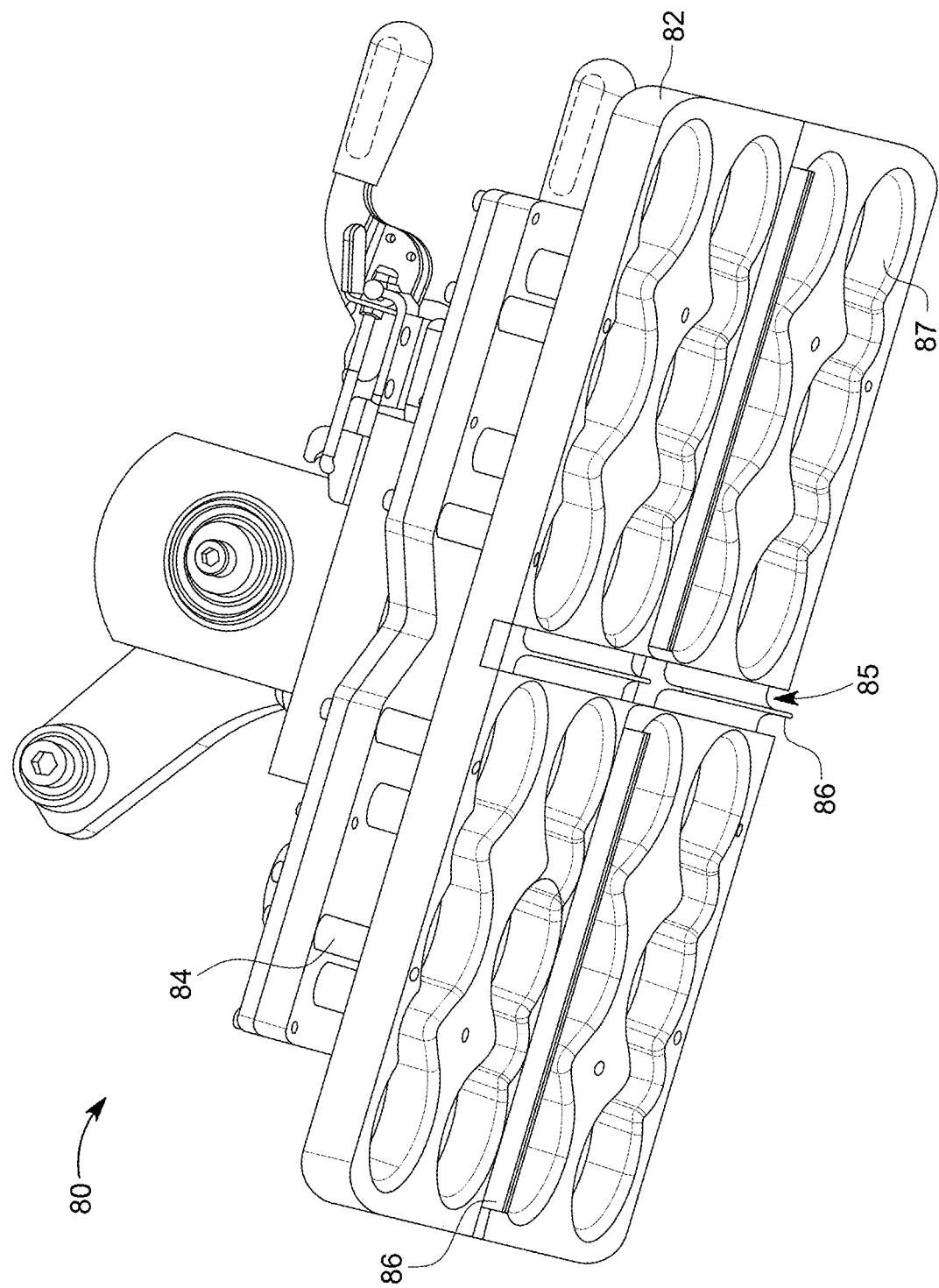
Figure 5:
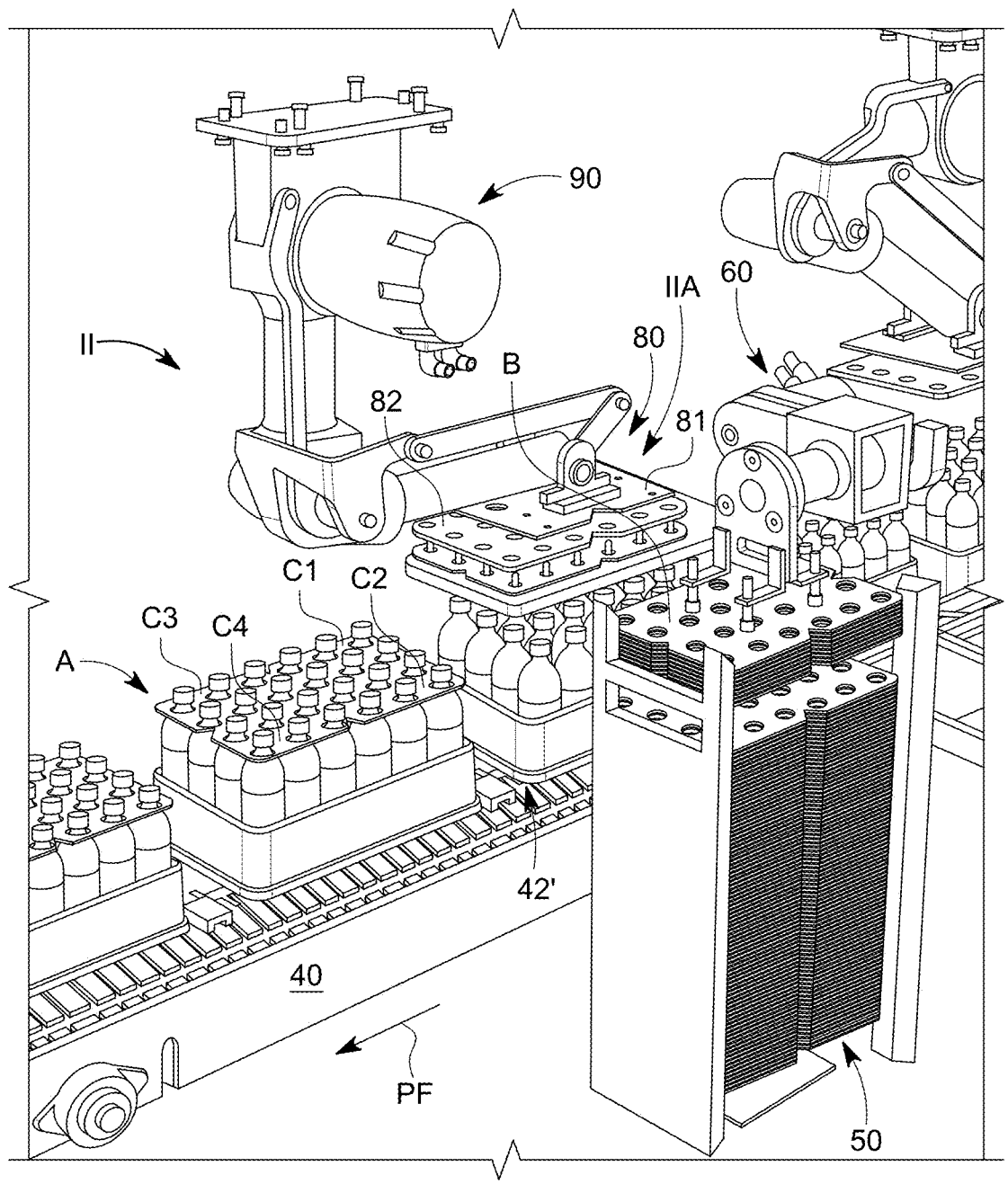
Figure 6:
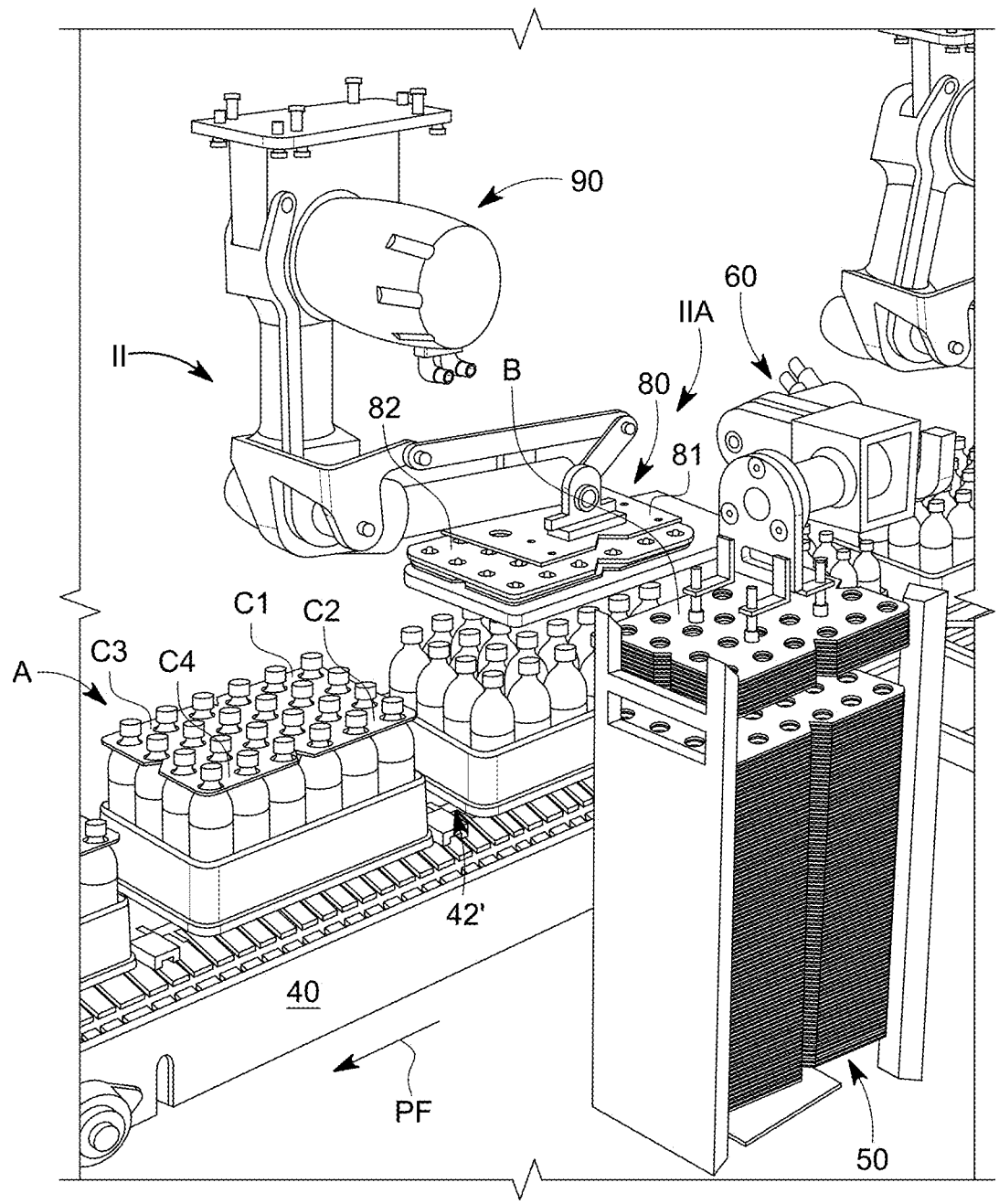
Figure 7:
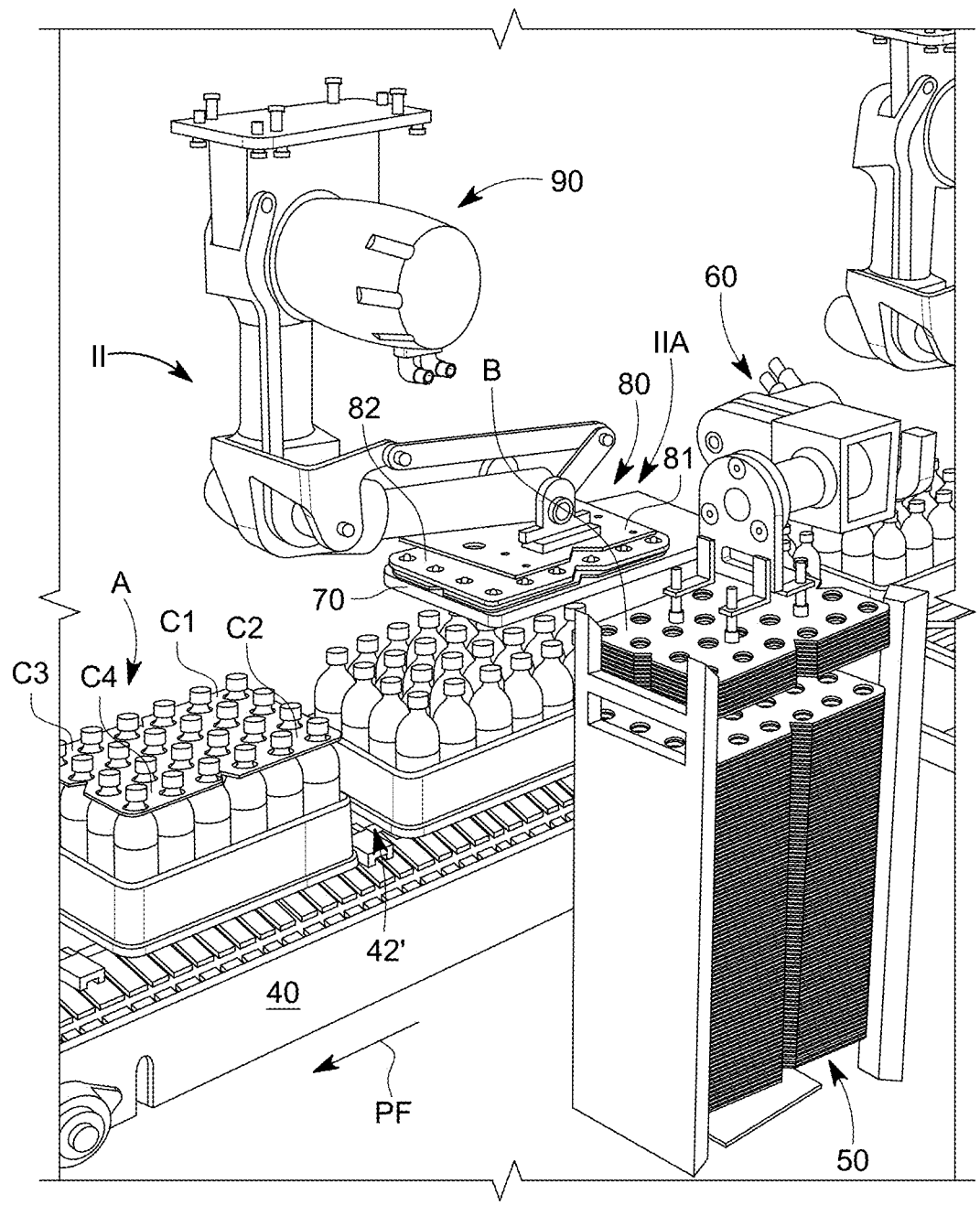
Figure 8:
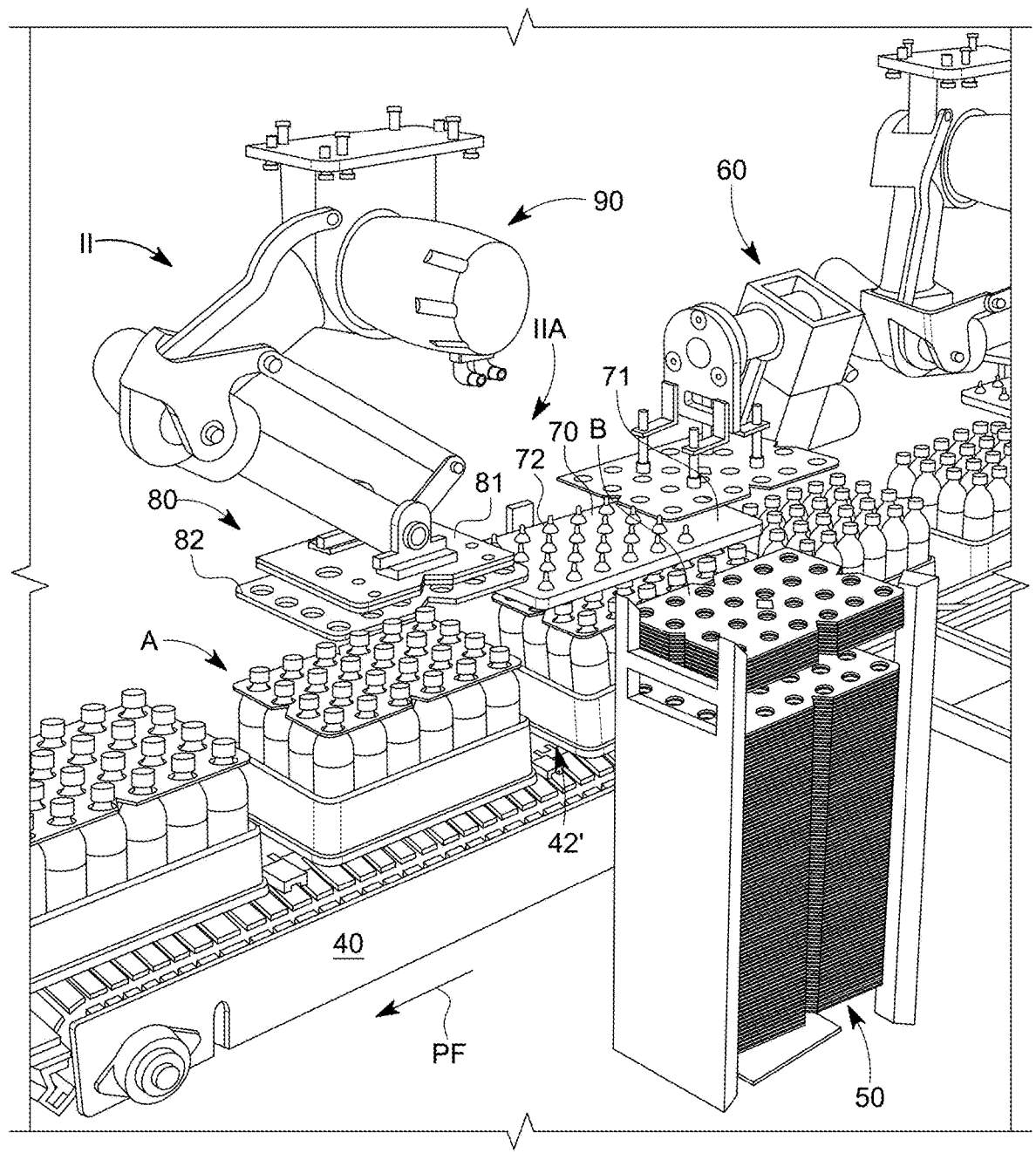
Figure 9:
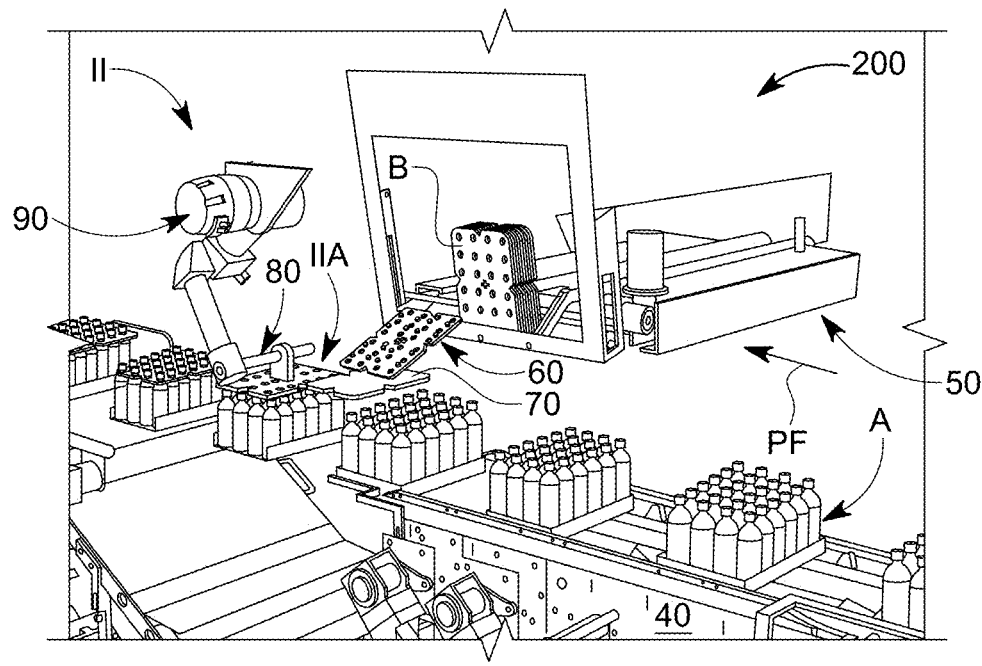
Figure 10:
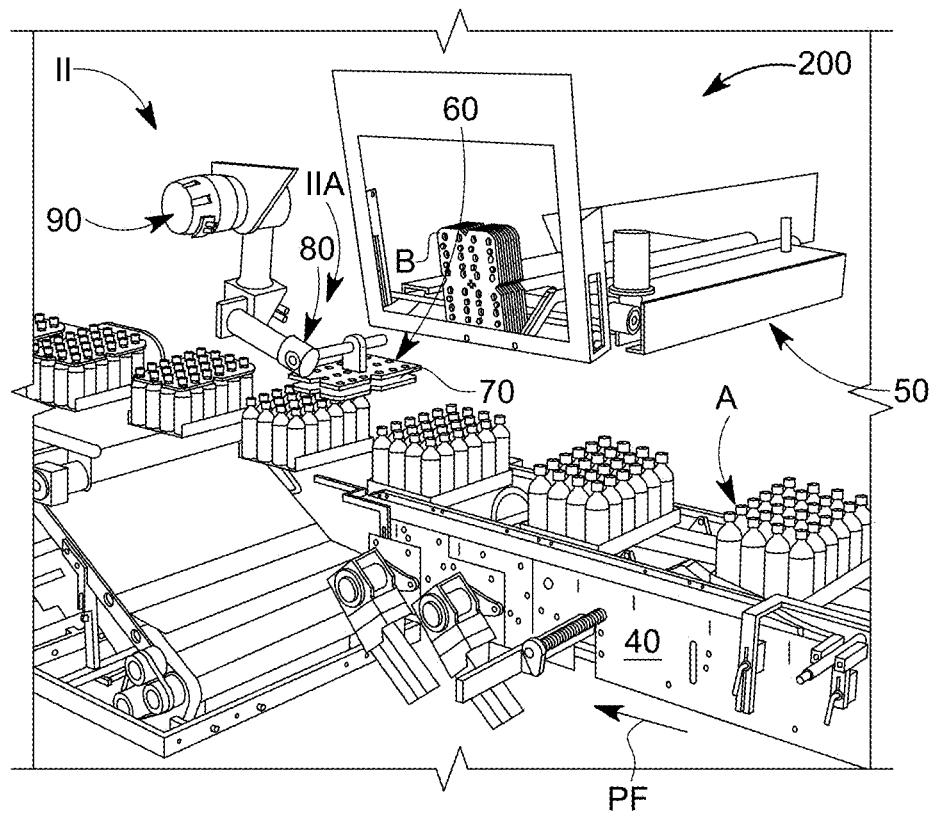
Figure 11:
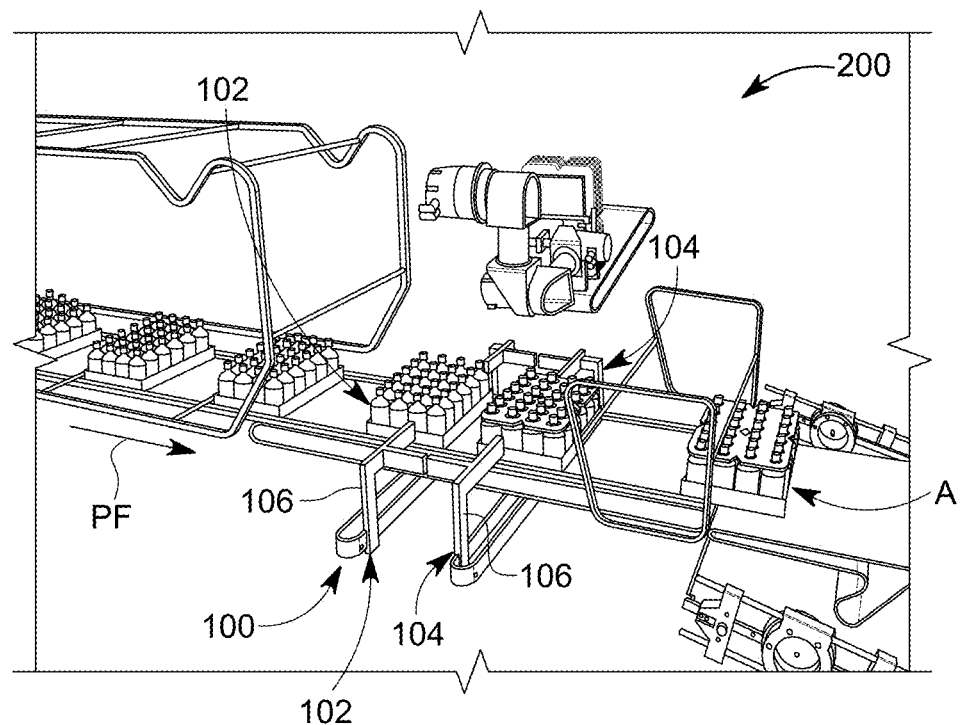
Figure 12:
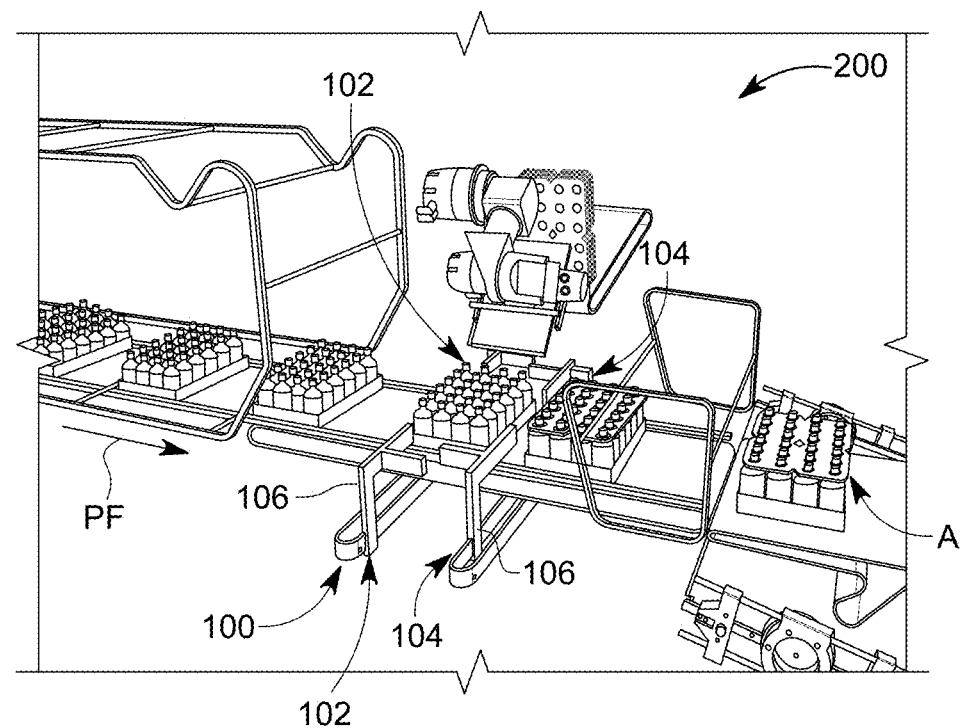
Figure 13:
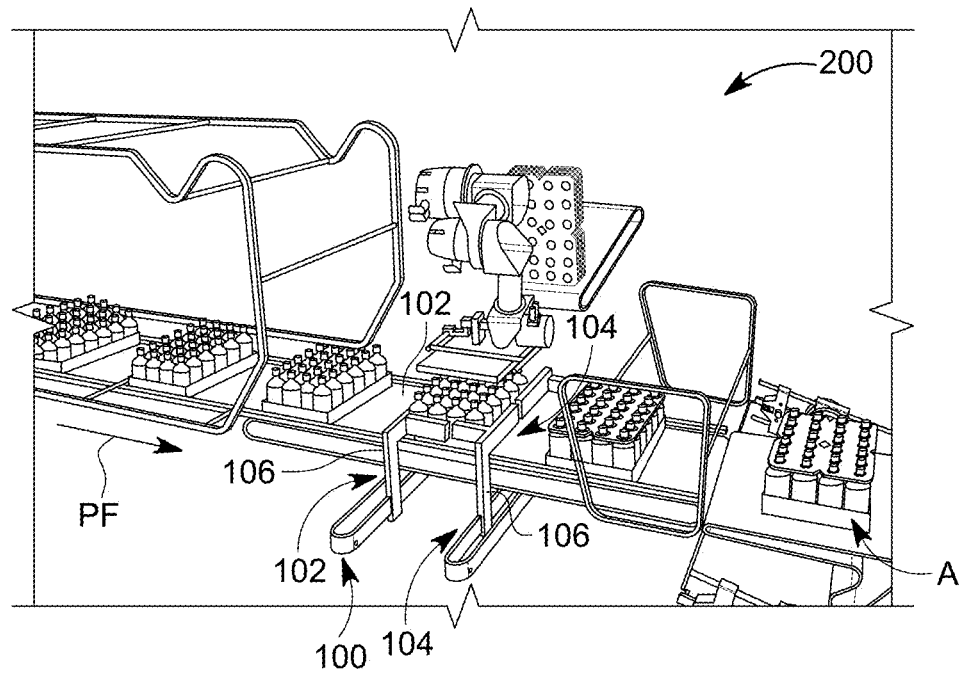
Figure 14:
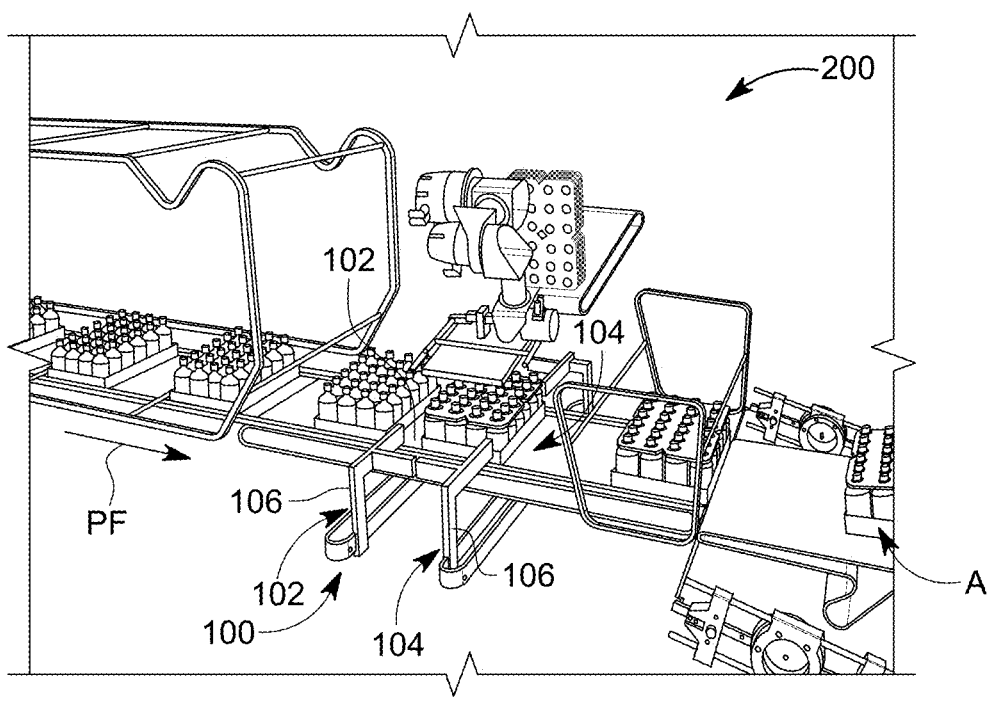
Figure 15:
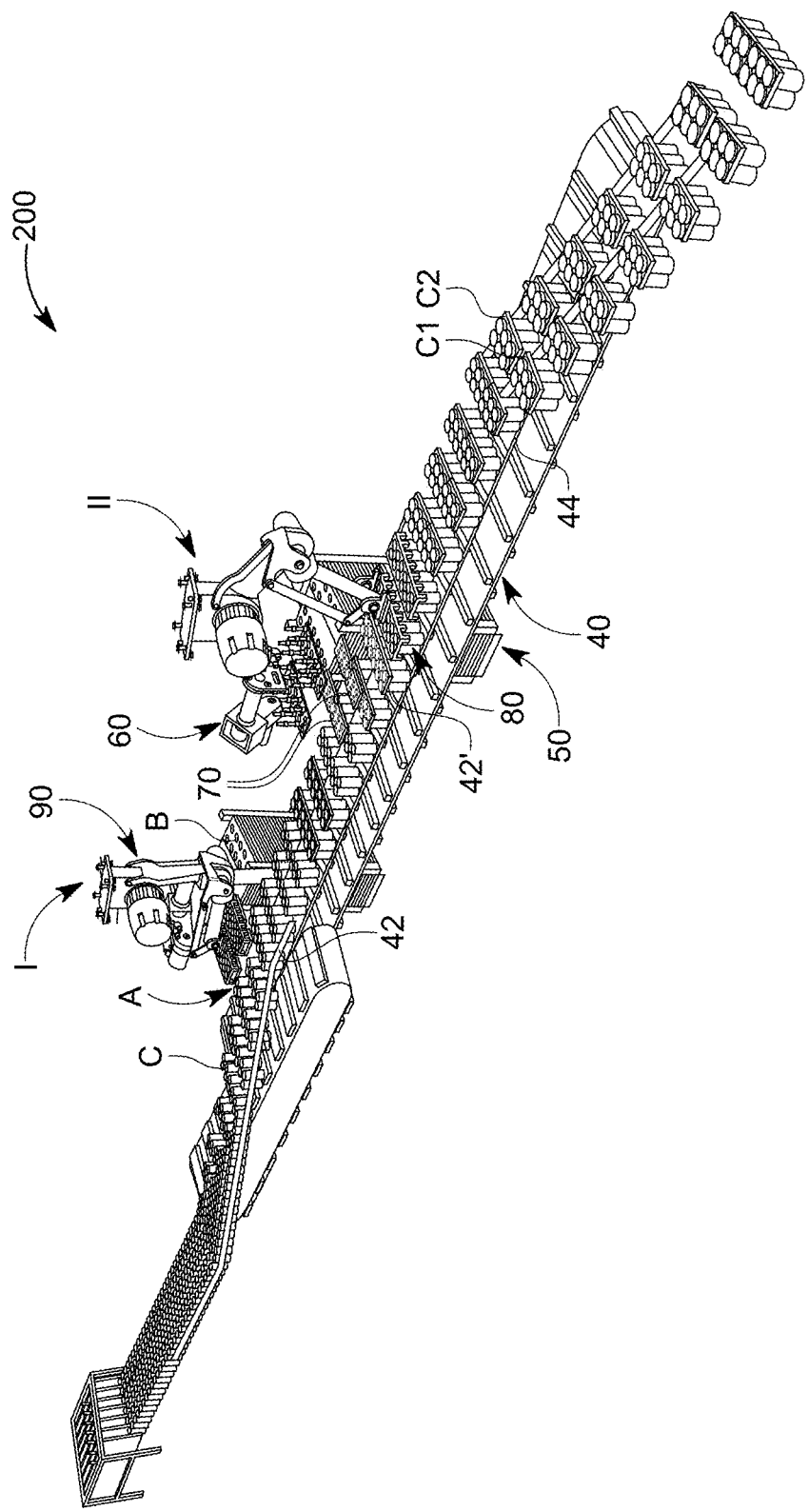
Figure 16:
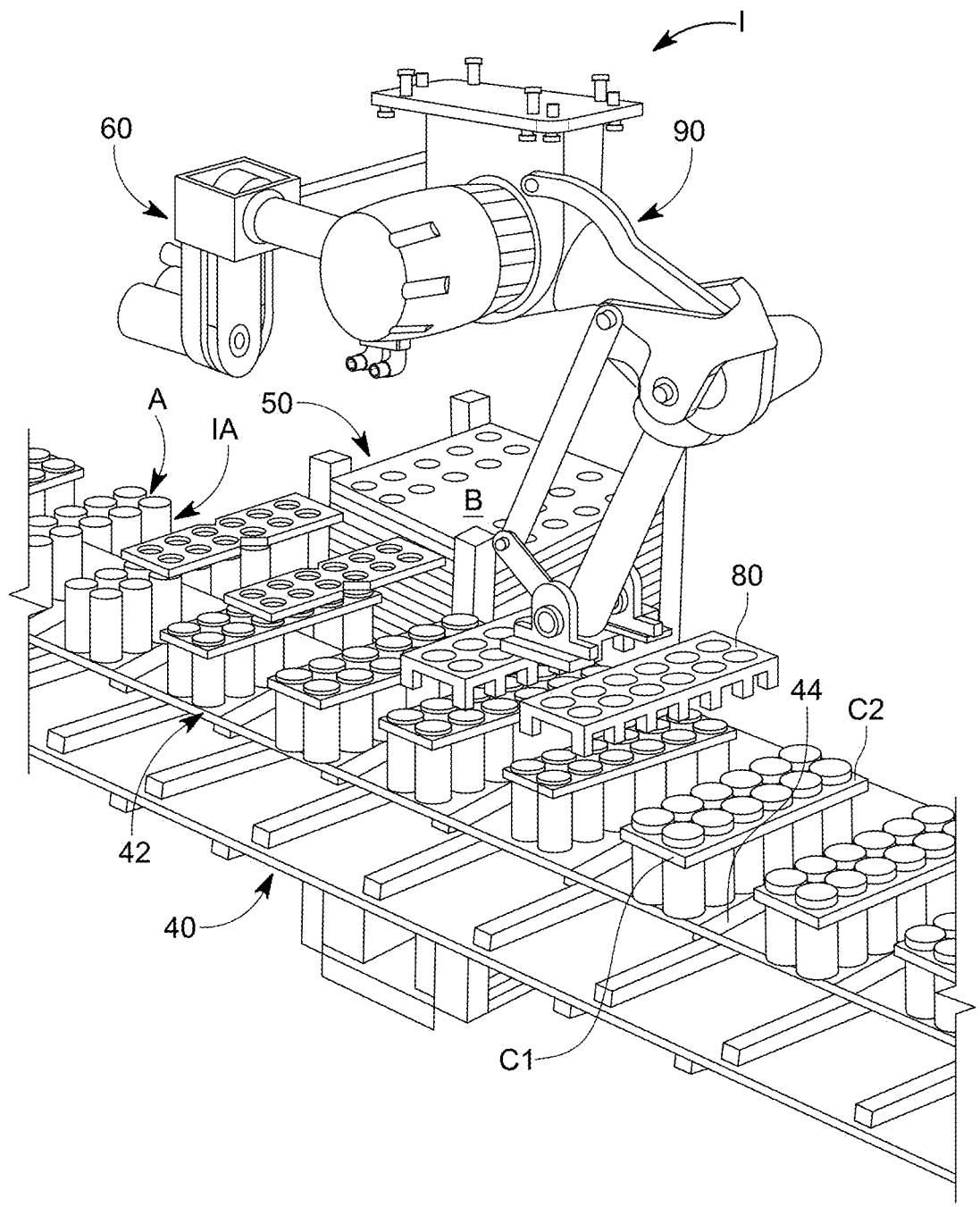
Figure 17:
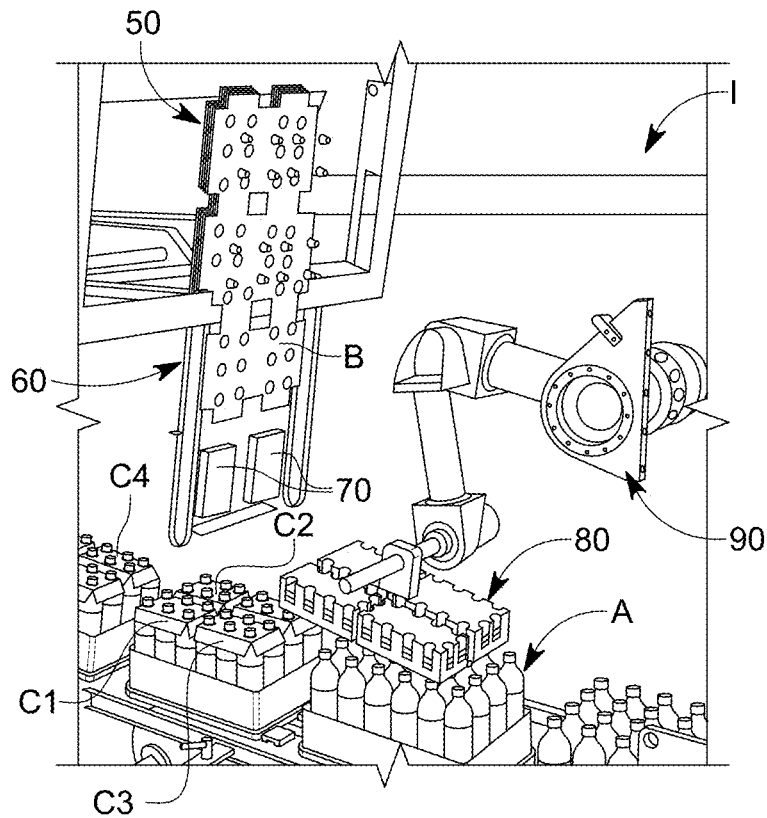
Figure 18:
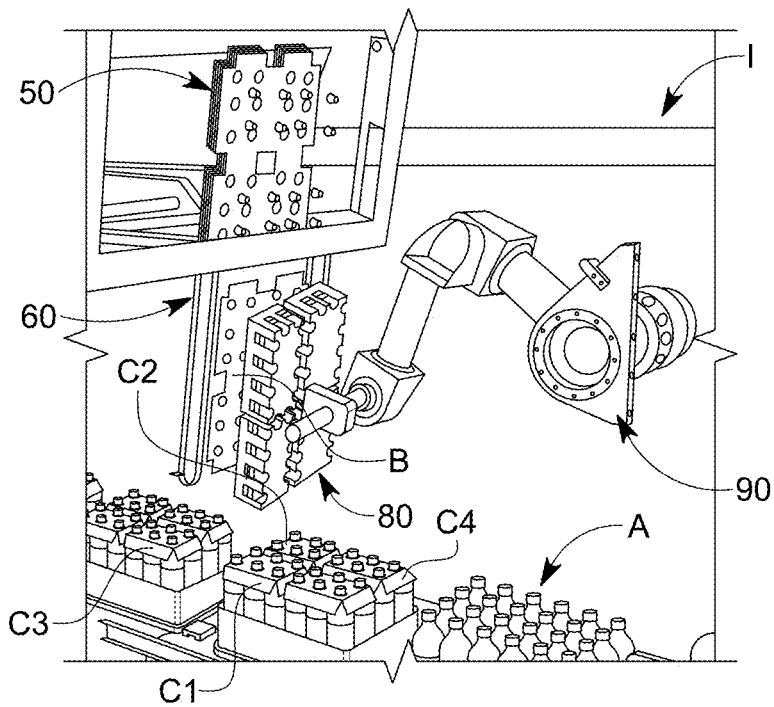
Figure 19:
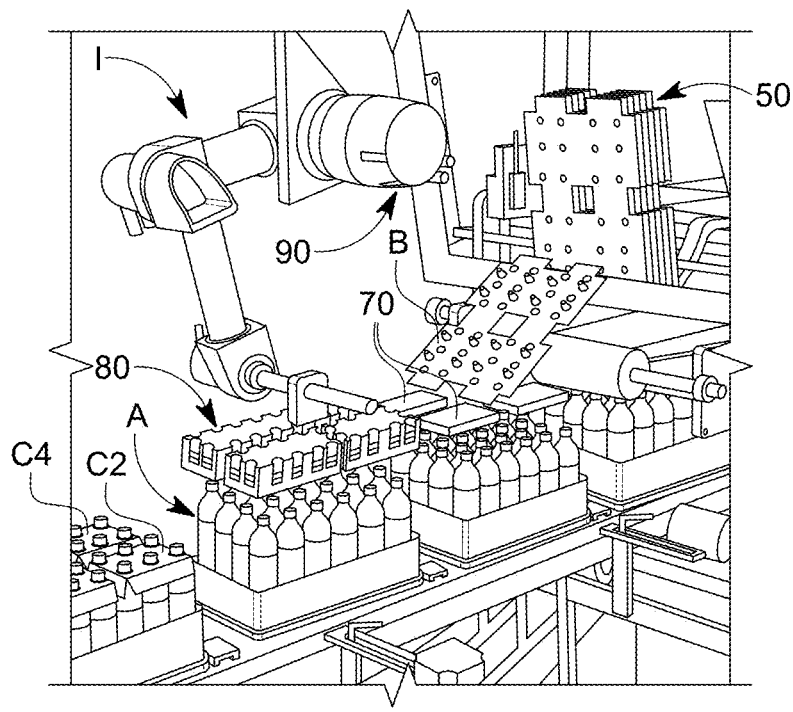
Figure 20:
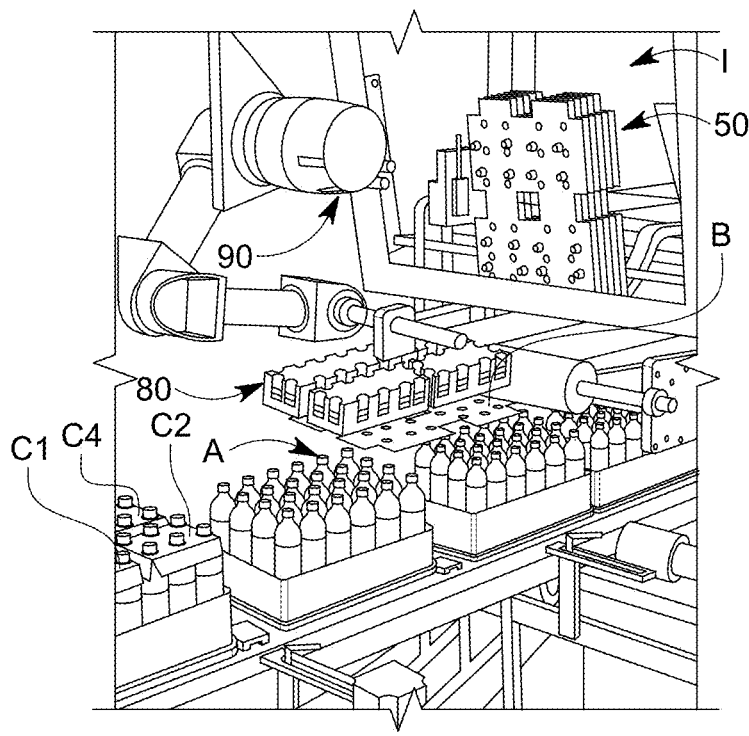
Figure 21:
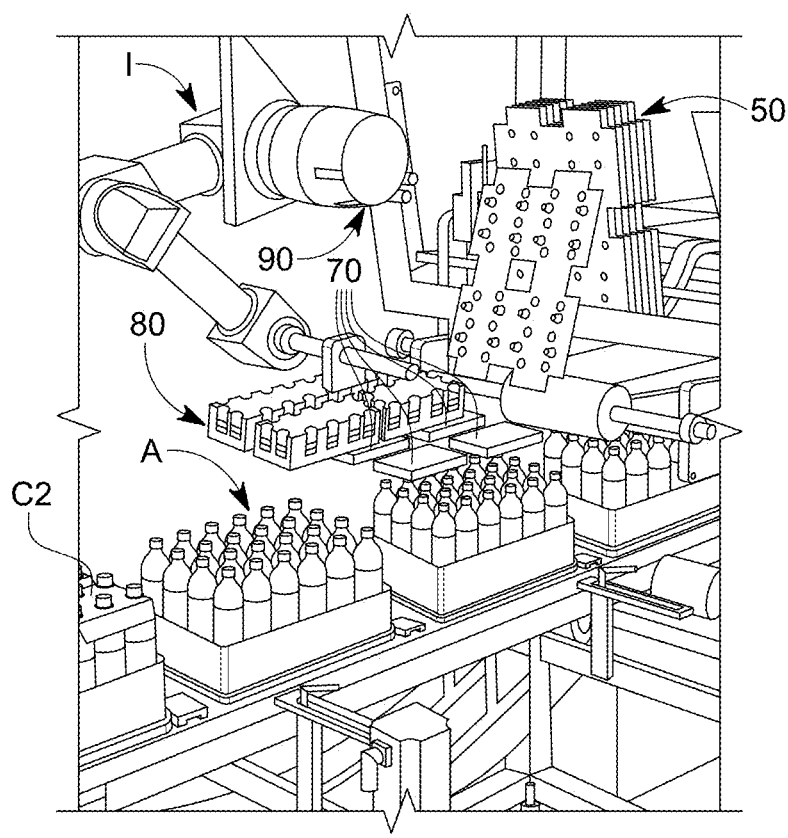
Figure 22:
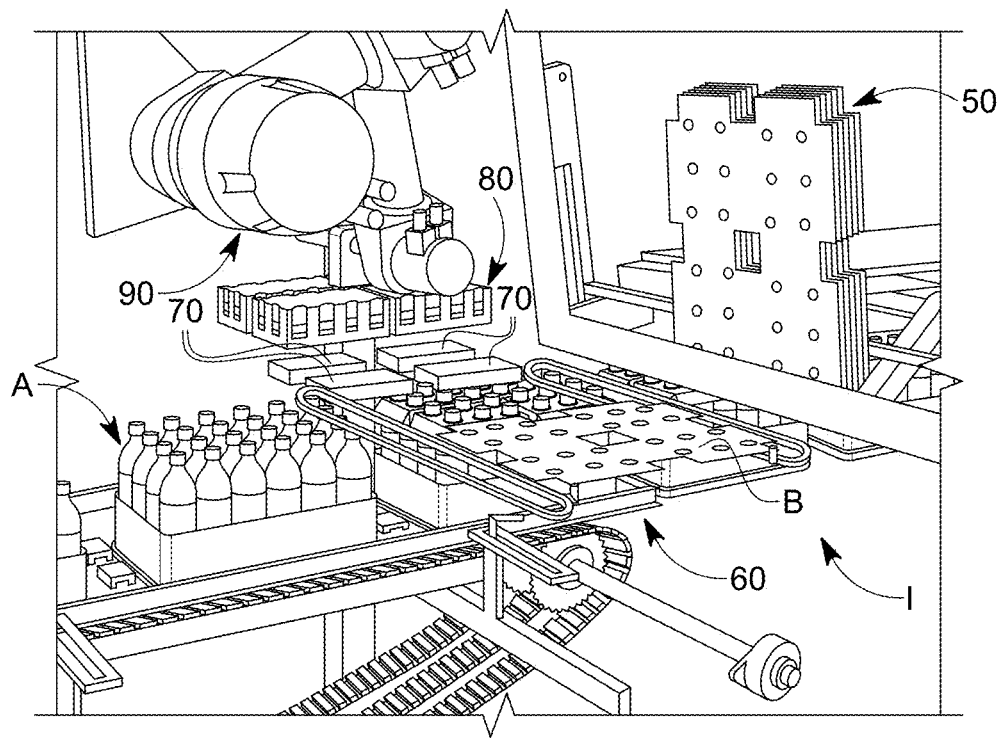
Figure 23:
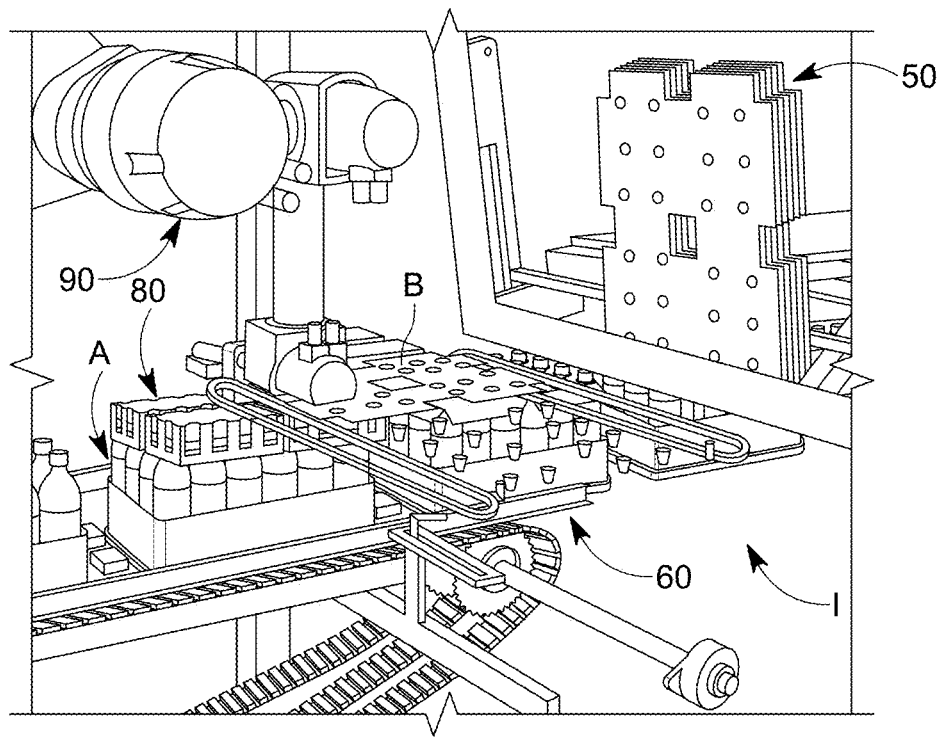
Figure 24:
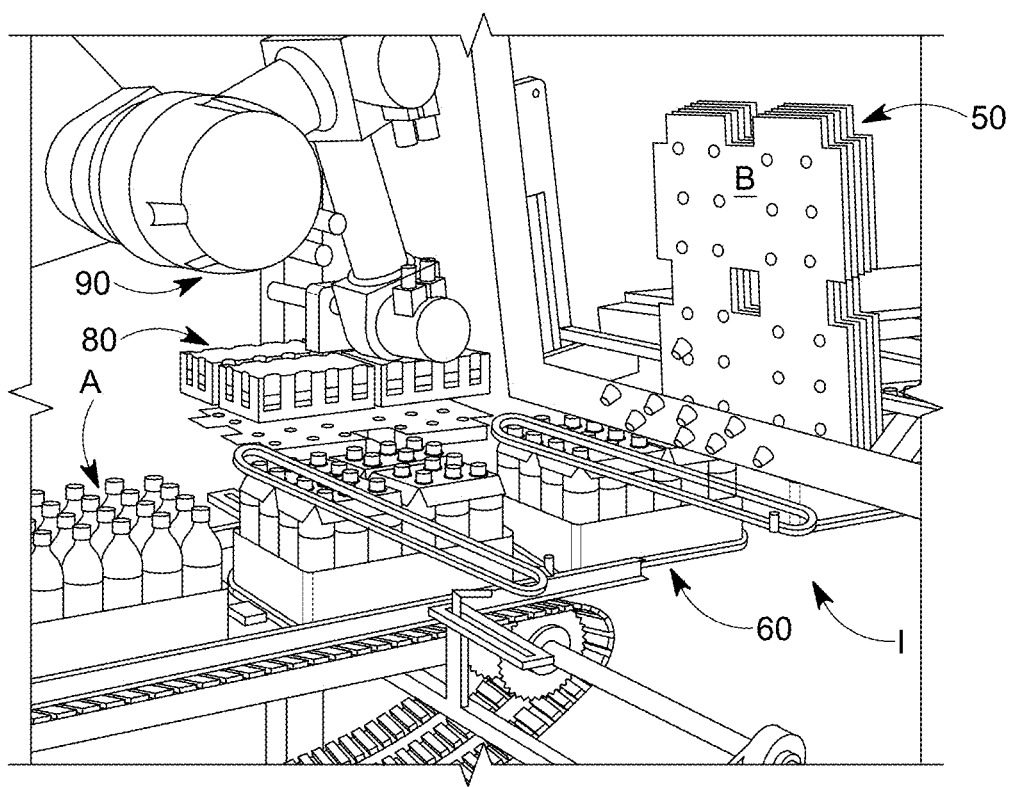
Figure 25:
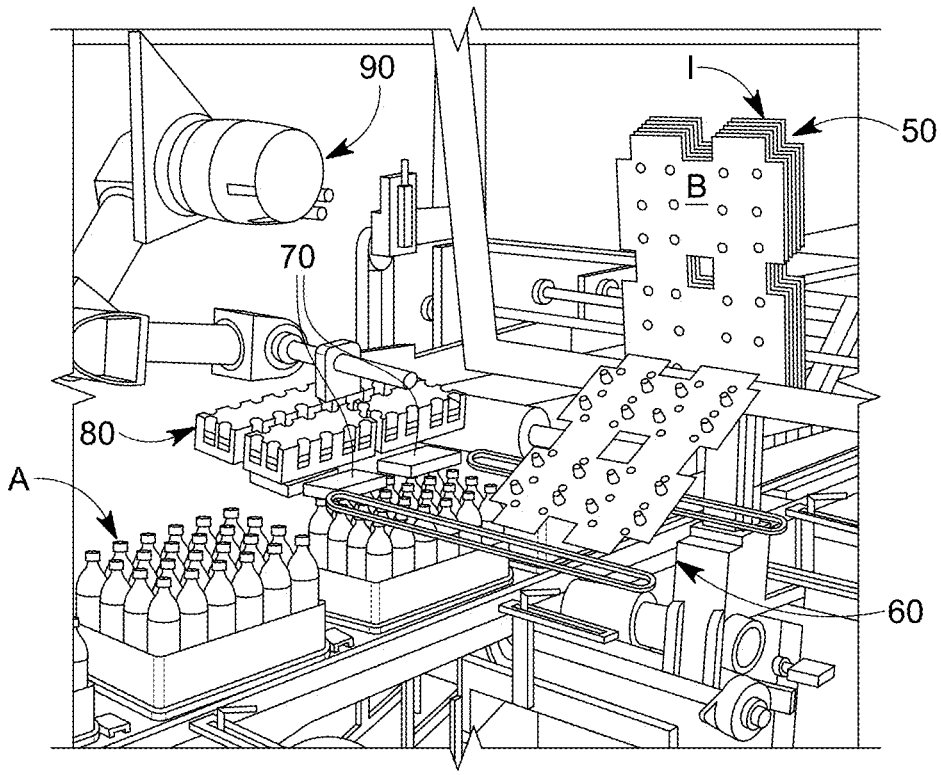
Figure 26:
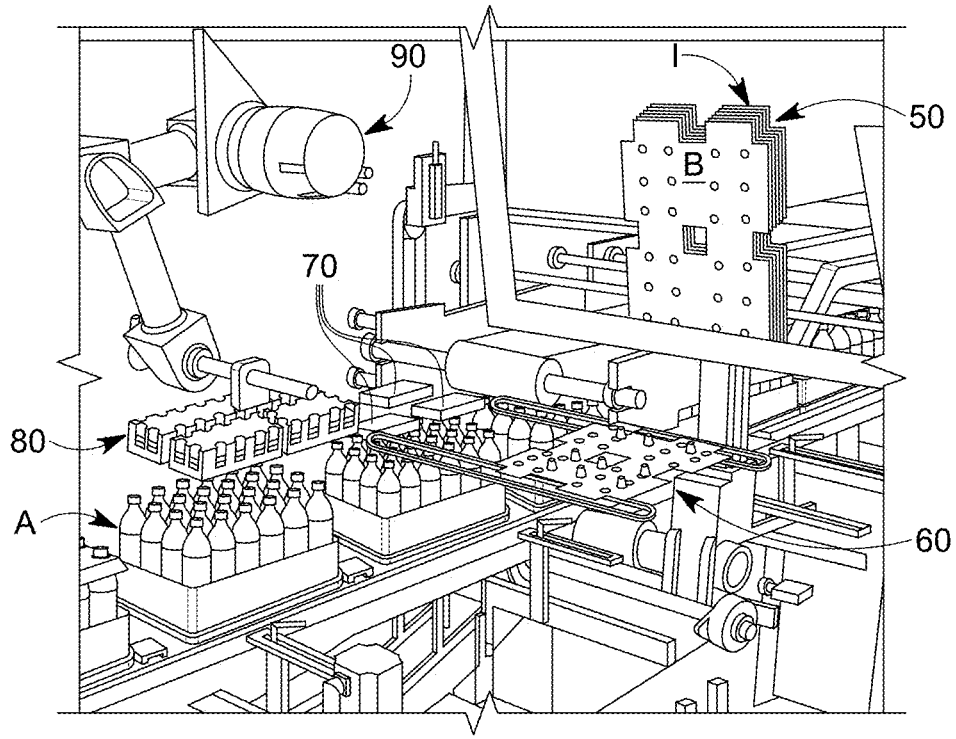
Figure 27:
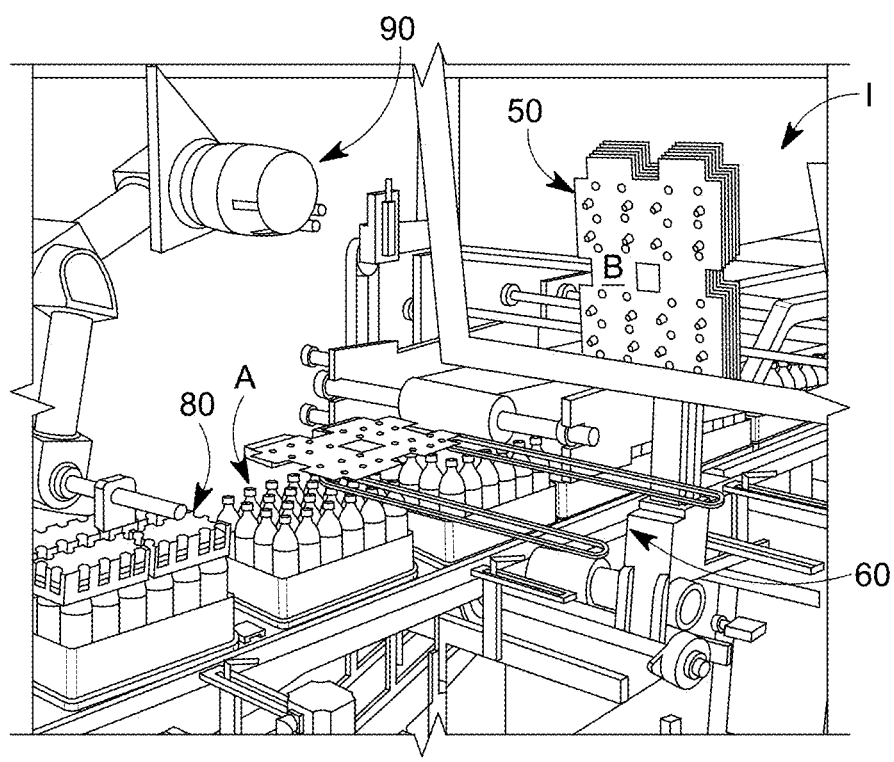
Figure 28:
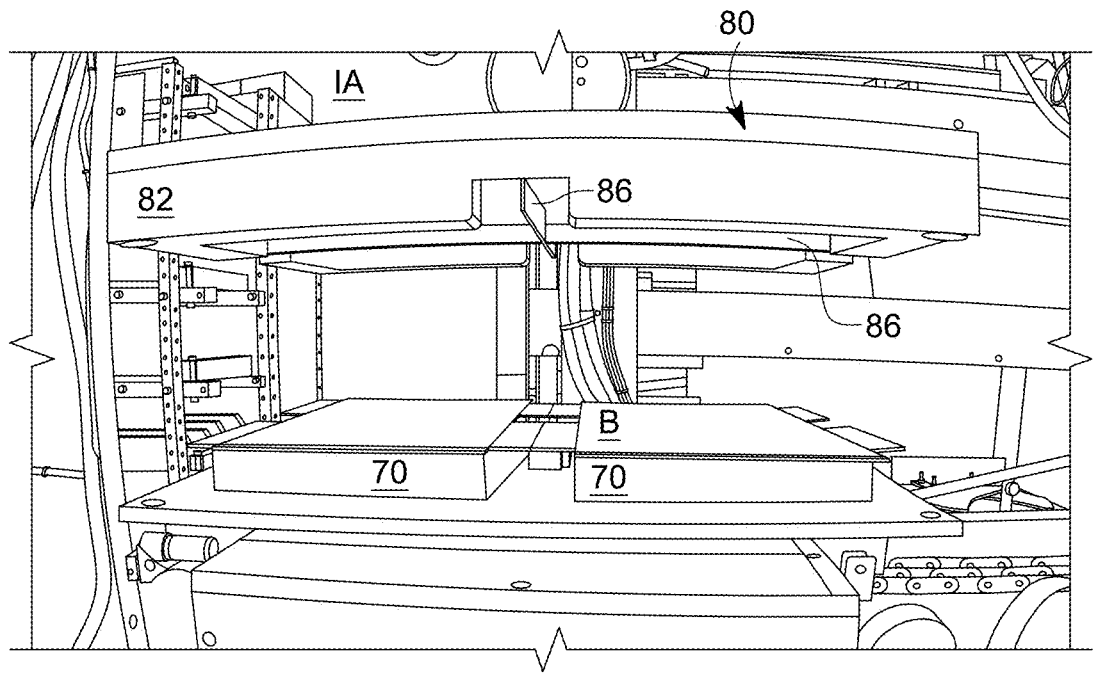
Figure 29:
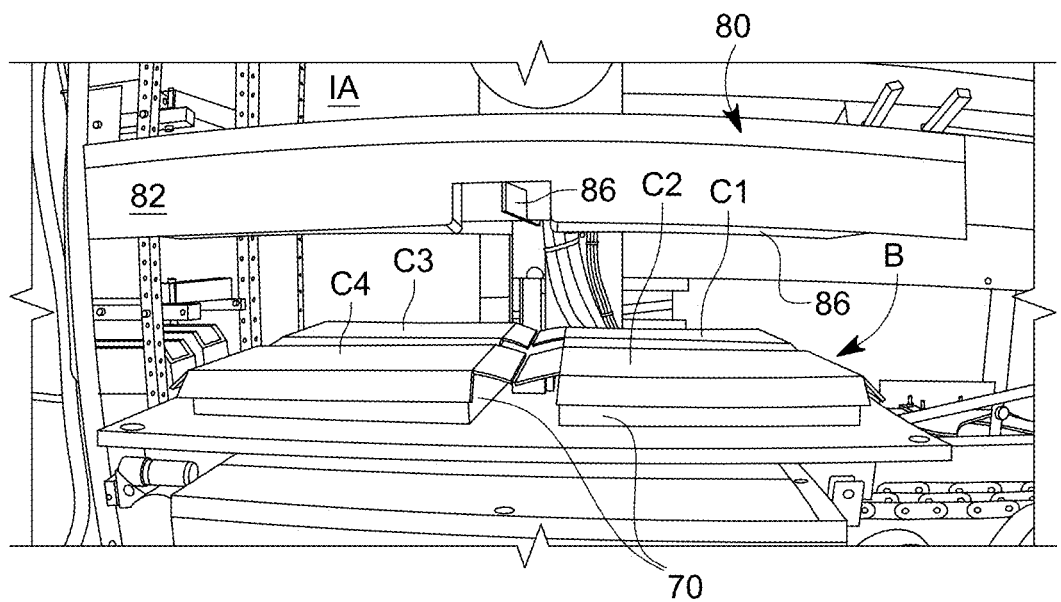
Figure 30:
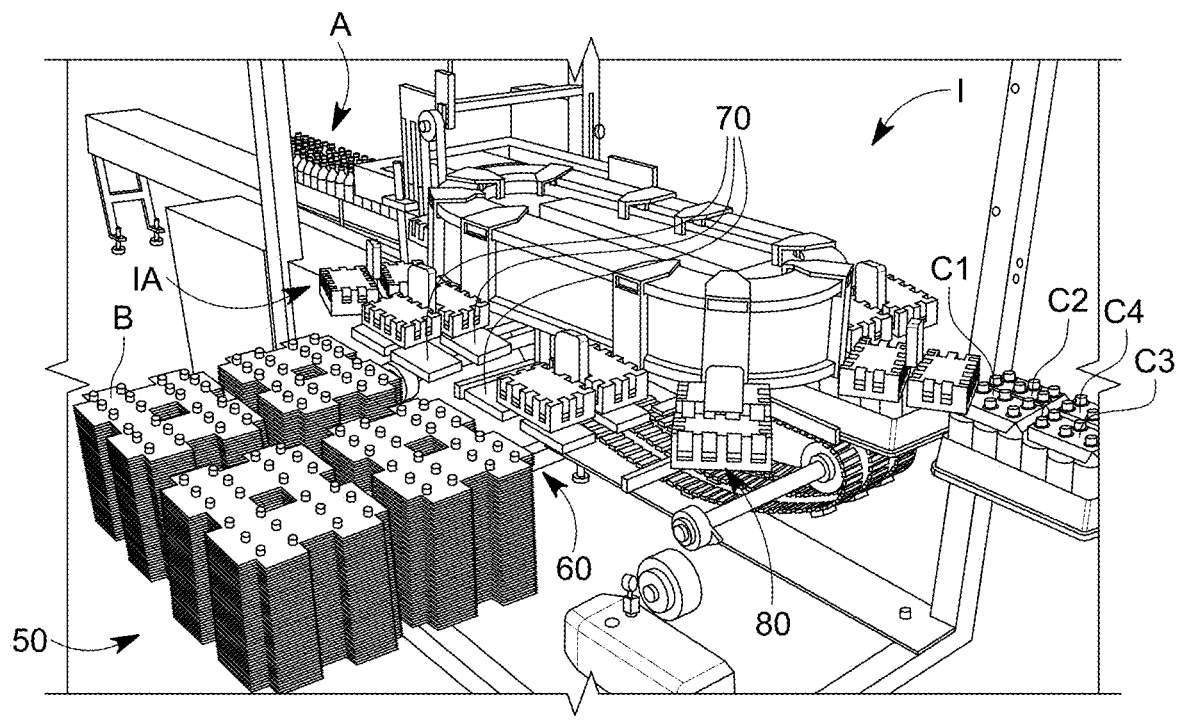
Figure 31:
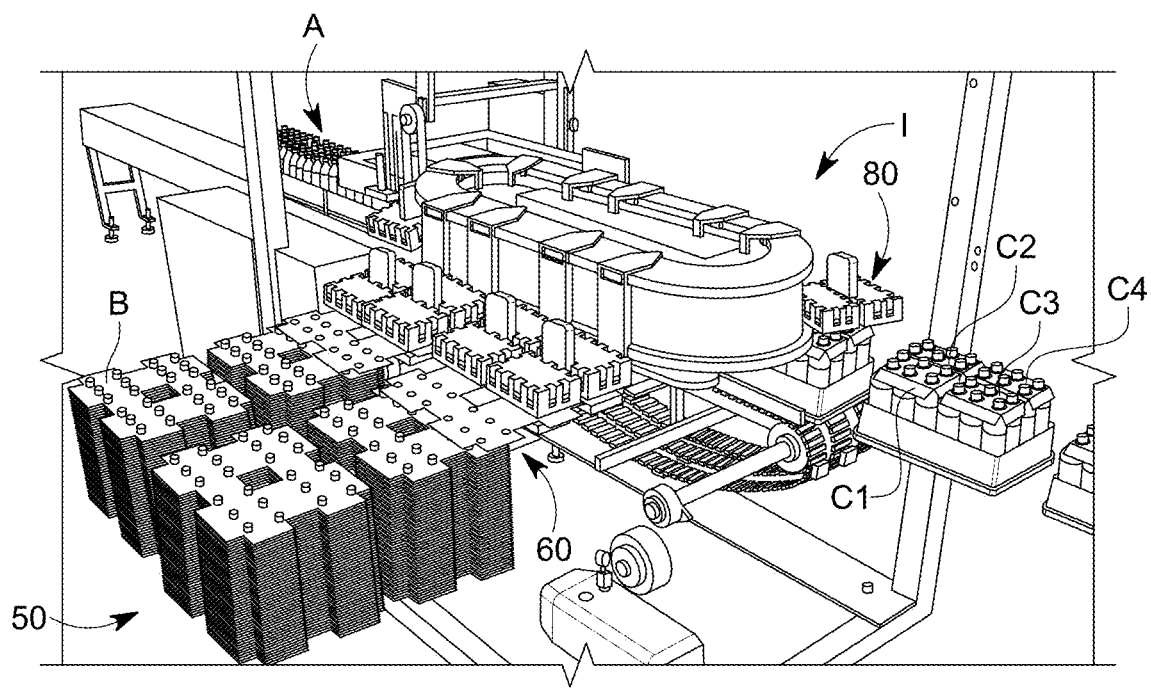
Figure 32:
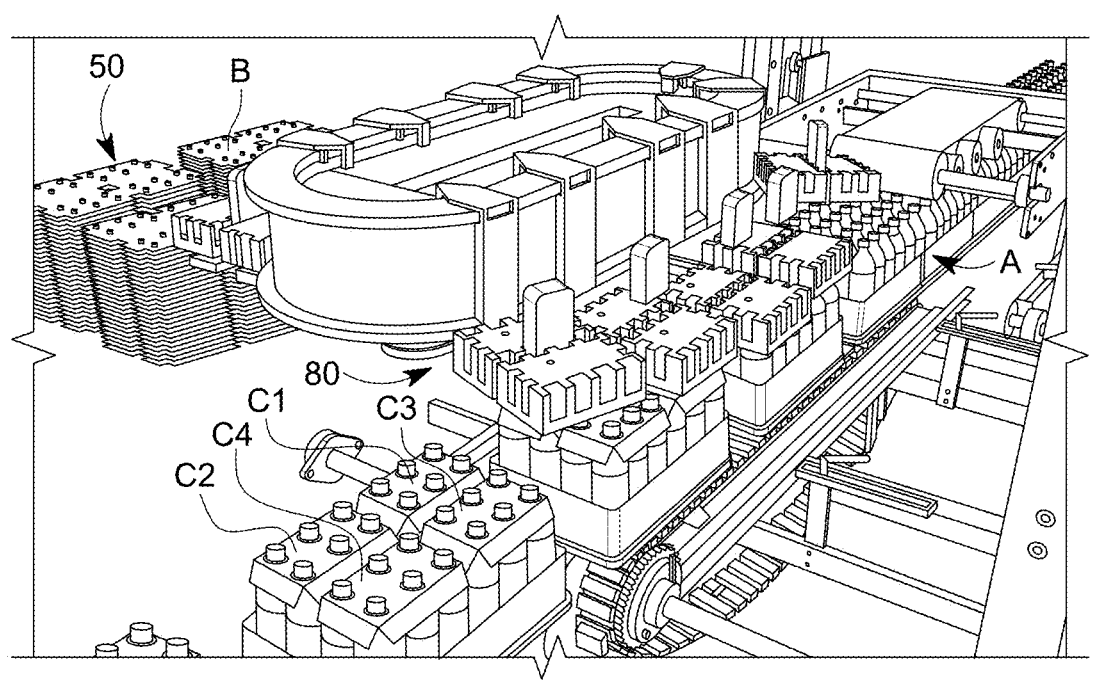
Figure 33:
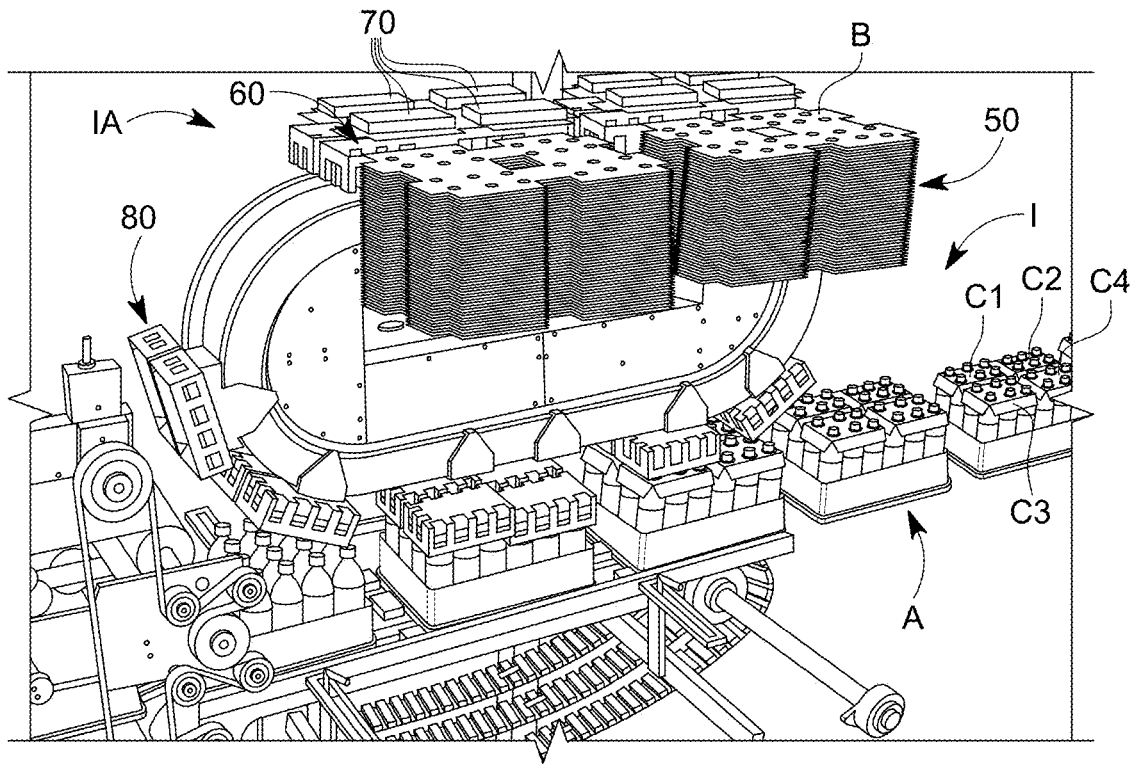
Figure 34:
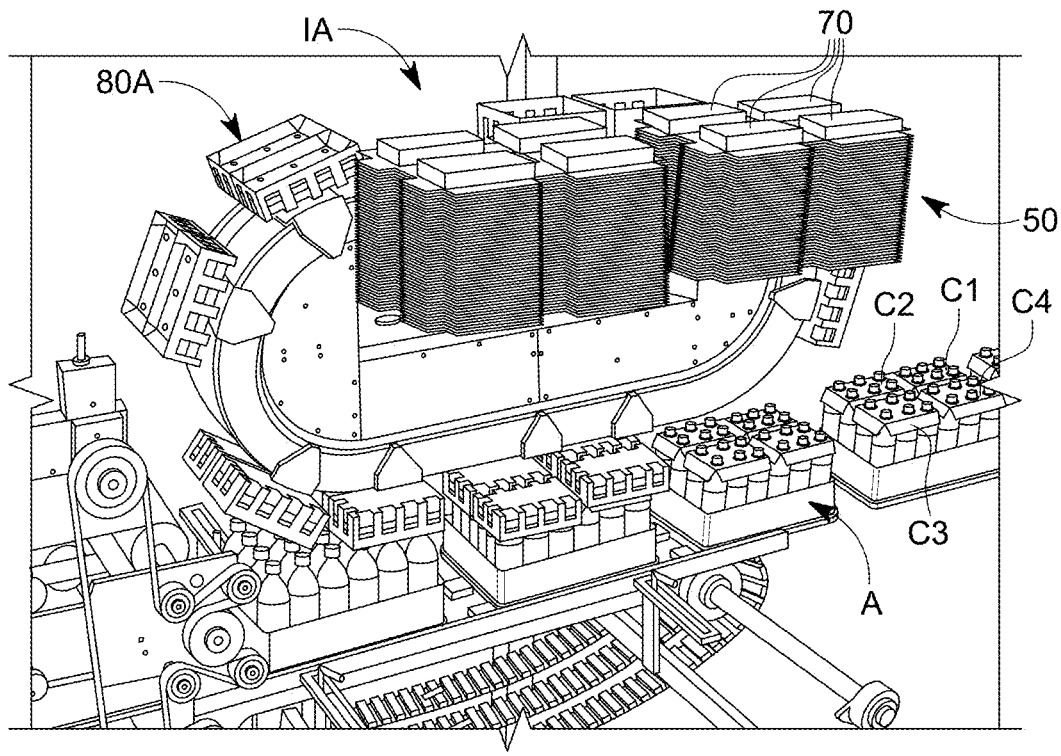

FIG. 2, corresponding to area 2 of FIG. 1, depicts a "pre-break" area of a processing station of the system of FIG. 1, namely, a first pre-break station thereof, a die block awaiting receipt of a retainer blank from a supply of retainer blanks;

FIG. 3, corresponding to area 3 of FIG. 1, depicts a further pre-break area of the processing station of the system of FIG. 1, namely, a second pre-break station downstream of the first pre-break station, a retainer blank from the supply of retainer blanks positioned in the die block for manipulation via a punch plate embodied in an end of arm tool (EOAT) of a robotic arm;

FIG. 4 depicts, elevation slightly from below, an advantageous, non-limiting EOAT of the robotic arm of the system of FIG. 1;

FIGS. 5-8 sequentially depict, "front" perspective, process flow right to left, select processing station operations of the system of FIG. 1, namely, an EOAT positioning over the die block loaded retainer (FIG. 5), advancement of the EOAT for engagement with the die block retainer combination (FIG. 6), engagement of the EOAT with the die block retainer combination (FIG. 7), removal of the manipulated/operated upon retainer from the die block via the robotic arm for affixation of same to an arrayed article group (FIG. 8);

FIGS. 9 & 10 sequentially depict, "front" perspective, process flow right to left, select processing station operations associated with a non-limiting first FIG. 1 system variant characterized by an alternate retainer blank supply and infeed configuration, retainer blank infeed operations (FIG. 9) and retainer blank engagement at the pre-break area of the processing station via the die set (FIG. 10) depicted;

FIGS. 11-14 sequentially depict, "front" elevation slightly from above, process flow left to right, a further supplemental operation attendant to intermittent motion processing via suitable adaptation of the FIG. 1 system, namely, squaring of arrayed article groups via a squaring assembly in advance of the application of a manipulated retainer to the squared arrayed article group, upstream and downstream squaring pairs in ready position (FIG. 11), downstream squaring pairs actuated for engagement with a leading edge of the arrayed article group (FIG. 12), upstream squaring pairs actuated for engagement with a trailing edge of the arrayed article group (FIG. 13), and resetting of the assembly subsequent to application of the manipulated retainer to the squared arrayed article group (FIG. 14);

FIG. 15 depicts "front" perspective slightly from above, process flow left to right, a non-limiting second FIG. 1 system variant for forming retained container groups from an arrayed container group via application of an adapted retainer blank (i.e., fold clip stock) to the arrayed container group;

FIG. 16, corresponding to area XVI of FIG. 15, depicts processing station operations of the FIG. 15 system, more particularly, up and down stream paired retainer blanks positioned upon spaced apart die blocks, the robotic arm EOAT carrying previously operated upon paired retainer blank pair set for affixing to an ACG;

FIGS. 17 & 18 sequentially depict, "front" perspective slightly from above, process flow right to left, processing station operations associated with a non-limiting third FIG. 1 system variant for forming retained container groups from an arrayed container group via application of an adapted retainer blank (i.e., fold clip stock) to the arrayed container group, an alternate configuration/layout for the retainer blank supply and die block (e.g., overhead in-line supply; co-planar dispensing), a retainer blank transferred from the retainer blank supply to/towards the die block via a shuttle assembly transfer apparatus (FIG. 17), the EOAT approaching the die block loaded retainer for operative engagement with the combination of the retainer blank and die block (FIG. 18);

FIGS. 19-21 sequentially depict, "front" perspective slightly from above, process flow right to left, processing station operations associated with a non-limiting fourth FIG. 1 system variant for forming retained container groups from an arrayed container group via application of an adapted retainer blank (i.e., fold clip stock) to the arrayed container group, an alternate configuration/layout for the retainer supply (e.g., overhead in-line supply with pivot dispensing in the process flow direction), a retainer transferred from the retainer blank supply to/towards the die block (FIG. 19), the EOAT approaching the die block loaded retainer blank for operative engagement with the combination of the retainer blank and die block (FIG. 20), and removal of the manipulated/operated upon retainer blank from the die block via the robotic arm for affixation of same to a downstream arrayed article group (FIG. 21);

FIGS. 22-24 sequentially depict, "front" perspective slightly from above, process flow left to right, processing station operations associated with a non-limiting fifth FIG. 1 system variant for forming retained container groups from an arrayed container group via application of an adapted retainer blank (i.e., fold clip stock) to the arrayed container group, an alternate configuration/layout for the retainer supply (e.g., overhead adjacent supply), a retainer blank pivotingly transferred from the retainer blank supply to/towards a transfer apparatus, e.g., a shuttle assembly (FIG. 22), the retainer blank transferred to/towards the die block via the shuttle assembly (FIG. 23), the EOAT approaching the die block loaded retainer for operative engagement with the combination of the retainer and die block (FIG. 24);

FIGS. 25-27 sequentially depict, "front" perspective slightly from above, process flow right to left, processing station operations associated with a non-limiting sixth FIG. 1 system variant for forming retained container groups from an arrayed container group via application of an adapted retainer blank (i.e., fold clip stock) to the arrayed container group, an adaptation of the fifth system variant wherein the robotic arm applies the manipulated retainer to a downstream arrayed container group versus an upstream arrayed container group;

FIGS. 28 & 29 respectively illustrate before and after states or conditions for a retainer blank (i.e., fold clip) subsequent to contemplated manipulations of the retainer blank at the pre-break area of the processing station via die set operations (i.e., registered mating and operative engagement of the EOAT with the die block);

FIGS. 30-32 sequentially depict, "front" perspective slightly from above, process flow left to right, processing station operations associated with a non-limiting seventh FIG. 1 system variant for forming retained container groups from an arrayed container group via application of an adapted retainer blank (i.e., fold clip stock) to the arrayed container group, the system characterized by a linear motion track system, clockwise motion, horizontally oriented over and coextensive with a portion of the conveyed ACGs in lieu of a robotic arm; and, FIGS. 33 & 34 sequentially depict, "front" perspective slightly from above, process flow left to right, processing station operations associated with a non-limiting eighth FIG. 1 system variant for forming retained container groups from an arrayed container group via application of an adapted retainer blank (i.e., fold clip stock) to the arrayed container group, more particularly, an adaptation of the seventh system variant, the station likewise characterized by a linear motion track system, counterclockwise motion, vertically oriented over and coextensive with a portion of the conveyed ACGs.

DETAILED DESCRIPTION OF THE INVENTION

In advance of particulars for contemplated system and/or processing embodiments and/or adaptation as to same as the case may be, several preliminary observations are believed warranted. More particularly, a high level overview of Applicant's work is set forth and thereafter an overview of the disclosure is provided.

Applicant provides, among other things, a system and/or process characterized by supremely efficient processing station operations owing to adoption of a "pre-break" operation effectuated by, notionally, a die set. Via such adoption, heretofore relied upon hardware in the form of pieces and parts and attendant actuators are eliminated, processing speeds in the form of throughout are increased inherently, and via modularity/repeatability of the processing station relative to the system, and, with processing station operations conducted within a reduced working envelope, system footprint, as measured by processing throughput, is reduced relative to similar throughput rated systems. While continuous motion processing is believed desirable and advantageous, it is not so limited, with intermittent motion processing likewise contemplated. Moreover, contemplated processing operations are not limited to a particular article infeed approach, nor are the contemplated processing operations believed limited to ACGs carried directly upon a conveyor surface in contradistinction to trayed ACGs or the like which are conveyingly transported in a tray or other such base/receptacle for retaining the ACG.

Notionally, a die set in the form of a die block and end of arm tool (EOAT) of a robotic arm, functioning as a punch plate, operate upon a retainer blank so as to at least divide same in furtherance of forming discrete retainer clips for container groups of the arrayed container groups (ACGs), the operated upon or manipulated retainer blank thereafter carried from the die block, via the robotic arm, to an ACG for operative receipt of the manipulated retainer blank. For example, the blank may be bifurcated in respect of one or both of its length and width dimensions via the pre-break operation, using single or multiple die blocks (or multi-part die blocks), and thereafter applied to an ACG comprised of a 2×1 array of 6-pack container groups (i.e., a 2×12 ACG), or an ACG comprised of a 2×2 array of 6-pack container groups (i.e., a 6×4 ACG). A supply of retainer blanks are provide, notionally in the form of either of a vertical or horizontal magazine, with a transfer device or assembly as the case may be, for transferring a retainer blank to the die block, likewise provided, such system elements being variably or optionally arranged in the context of the contemplated system configurations.

While form generally fits function, adaptations of the die set are contemplated commensurate with the object container (e.g., volume, configuration, etc.), container group size and container group clipping format and/or style. For instance, and without limitation, containers such as bottles and cans are contemplated for processing. Further still, with a variety of container volumes known and available for processing (e.g., 7.5, 12, 17.5 oz), pack patterns and thus ACG clipping is oftentimes a balance between individual container volume and clipped package size. Finally, while numerous top clip formats and/or styles are known and available, the instant disclosure takes up what are referred to as flat and fold/folded clips. As to the former, the clips and corresponding blanks are generally flat pre and post ACG application. As to the latter, while the clips and corresponding blank are generally flat, tabs that generally characterize this top clip format blank are "folded" (e.g., bent or otherwise manipulated) upon ACG application so as to create one or more panels. i.e., a skirt, which commonly carries consumer messages/messaging relating to the goods and/or the source of the goods.

The instant disclosure commences with a presentation of an advantageous, non-limiting continuous motion processing system for advantageously forming four (4) retained container groups from a 6×4 ACG via application of an adapted retainer blank, characterized by discrete flat clips, to the ACG, the system characterized by spaced apart processing stations (FIG. 1 and related figures FIGS. 2-4). The depicted system contemplates the processing of 0.5l PET bottles at a nominal throughput of 60 cases per minute (CPM). Thereafter, operation of the FIG. 1 system is taken up in connection to the time varied processing operation sequence depictions of FIGS. 5-8, with alternate FIG. 1 system configurations, in relation to the contemplated or adapted processing station (FIG. 9 first variant, FIG. 11 adaptation thereof, respectively) thereafter set out. The depicted FIG. 9 system contemplates processing of 7.5 oz cans for fold clip pack formation at a nominal throughput of 37.5 CPM. Subsequent FIG. 1 system variants (e.g., each of those of FIGS. 15, 17, 19, 22, 25, 30 & 33, corresponding to second through eighth variants) contemplate operations in connection to a fold clip as the FIG. 9 system, with representative, non-limiting die set operations generally appreciated with select reference to the time varied processing operation sequence depictions associated with each variant, and which are likewise depicted in a contemplated die set operation (FIGS. 28 & 29) evidencing, among other things, retainer blank pre-break operations.

Referring now to FIG. 1, and selectively to the subordinate depictions of FIGS. 2-4, an advantageous, non-limiting processing system 100 for forming retained container groups. i.e., container group "packs," from an ACG via application of a retainer blank thereto is generally shown. The instant view is "rear" elevation, process flow left to right. The depicted system advantageously contemplates continuous motion processing, however, adaptations of the depicted system are likewise contemplated for intermittent motion processing. Moreover, while a "flat" retainer in the form of a "flat clip" is contemplated in relation to the depicted system, system elements or assemblies, adaptations of the depicted system are likewise contemplated for forming retained container groups from an ACG via application of alternately configured or styled retainer blanks, for example and without limitation "fold" or banner retainers in the form of a "fold clip."

Notionally, and as is generally depicted, system 200 is fairly characterized by a container conveyor apparatus 40 for conveying ACGs (A) in a process flow direction, a supply of retainer blanks, in the form of a magazine 50, from which retainer blanks (B) are dispensable, at least a single processing station I, two indicated (i.e., station I & station II) FIG. 1, and a transfer apparatus or assembly 60 for delivering a retainer blank to the processing station. As will be later detailed, the processing station is fairly characterized by a segment 42 of container conveyance apparatus 40 and a die set, more particularly, a die block 70 and mating punch plate embodied in a end of arm tool (EOAT) 80 carried by a robotic arm 90. The robotic arm is operable so as to selectively position the EOAT within the processing station, the EOAT positionable for urged engagement of a dispensed retainer blank received upon the die block so as to form and secure a divided retainer blank, the robotic arm thereafter positionable to register the secured divided retainer blank with an ACG conveyed on the container conveyance apparatus segment of the processing station. The robotic arm is further positionable to apply the secured divided retainer blank to the registered ACG to thereby form at least two retained article groups, i.e., "packs," from the registered conveyed ACG.

Container conveyance apparatus 40 is provided for conveying ACGs in a process flow or processing direction as indicated (PF→, +x-direction of the x, y, z coordinate system indicated). The apparatus is generally characterized by an endless flighted belt 44 and a suitable belt drive assembly 46 as shown, however, the contemplated system in all its forms need not be so limited. While the arrayed container groups may be trayed or otherwise characterized by a bounded footprint as shown, contemplated processing need not be limited to such characterization. Tandem processing is believed advantageous but not necessary, such processing evidenced by repeating processing stations I & II of FIG. 1 wherein segments 42, 42' are characteristic of those stations.

As to ACG formation, known or adapted processes to effectuate same are believed generally suitable. Notionally, in the context of the contemplated systems and processes, an ACG is considered a work piece. While a several ACG formation processes may be depicted in the figures herewith, those supplementing the small operational footprint of, for instance, the FIG. 1 system, is believed desirable. Moreover, optionally as shown FIGS. 11-14 et seq., a squaring assembly 100 may be provided as processing circumstances and objectives warrant.

As to squaring assembly 100, notionally a presented ACG is located and readied for registered receipt of operated upon retainer blank via such assembly. Preferably, but not necessarily, the assembly is characterized by upstream-trailing and downstream-leading edge squaring device portions or pairs 102, 104. Actuatable squares 106 are drawn together to engage opposing portions of the presented ACG. The squares may be readily supported, configured and controlled for such operation. With the presented ACG stopped in/at the processing station, the leading edge is squared, with the trailing edge thereafter squared; the downstream portion of the squaring assembly continues an ACG engagement while the upstream portion of the squaring assembly actuates and engages the trailing edge. With all corners of the presented ACG secured via squares of the squaring assembly, the EOAT of the SCARA delivers and affixes the container carrying device thereto/thereupon.

As to the supply of retainer blanks, and in the context of the FIG. 1 system, magazine 50 comprises a vertical magazine adjacent container conveyance apparatus 40, more particularly, but not necessarily, spaced apart in the z-direction from processing station container conveyance apparatus segment 42 and in x-direction alignment with a pre-break area (IA) of station I delimited by die block 70. As will be readily appreciated with reference to alternate system configurations/layouts, see e.g., FIGS. 9, 17, 19, 22, 25 & 30, the magazine configuration, vertical or horizontal, and its placement relative to the processing station and/or container conveyance apparatus is variable, such specification and/or relationships intended to be illustrative and not limiting, and generally supportive of a minimal/minimized footprint for undertaking the sought after processing. Moreover, it is further contemplated that the magazine be refillable on-the-fly (i.e., without processing disruption). Towards this end, for example, the magazine may be characterized by a working queue and a secondary queue, the secondary queue formable during dispensing retainer blanks from the working queue, as by, for example, a dedicated loader for that purpose.

A representative, non-limiting retainer blank B is best seen with reference to FIG. 2. This retainer, embodying four (4) flat clips, is a planar or sheet element, adapted as shown via the inclusion of repeating patterns of apertures. A first set of patterned apertures 110 as shown advantageously but not necessarily comprise finger holds, the apertures may be through holes, or partial cutouts delimiting tabs through which a finger is passable. A second set of patterned apertures 112 as shown advantageously permit receipt of the retainer about upper portions of the containers of the ACG, the apertures further advantageously characterized by radial extending spaced apart lines-of-weakness or the like 114 which delimit fingers 116 for container engagement.

Contemplated retainer blanks are further and fairly characterized by die lines 118 which delimit individual clips (C) which are affixable to a subset of the ACGs, namely the container groups for clipping so as to form a pack. Single or double die lines are common, double as shown (NB: but see FIG. 16 for single), to produce two and four container group packs from the ACG. In respect of the illustrated retainer blank, divisions (i.e., bifurcations) are contemplated intermediate the long and short dimensions of the blank, in the z and x-directions as indicated, so as to form four retainer blank portions corresponding to four six-pack flat clips. As will be later taken up, the EOAT of the robotic arm effectuates operations upon the retainer blank while securing the operated upon retainer blank for transfer and application to the ACG.

Delivery of a retainer blank to the processing station is advantageously, but hardly exclusively effectuated via a picker, for example, a rotating or pivoting arm assembly 60 as shown. Assembly 60 is fairly characterized by a link/linkage 62 and an arm 64 extending therefrom, the linkage and arm pivotable about a pivot axis 61 extending in the x-direction via a belted drive assembly 66, and a blank holder 68 supported by arm 64 via a bearing 63, the blank holder equipped with elements of a vacuum system for engaging and attaching to the retainer blank. Via the contemplated assembly, the blank holder is driven in the z-direction to effectively load the die block of the processing station. Owing to blank style/format and configuration, multi-head pickers may be advantageous as the real estate for engaging the blank may be limited/greatly reduced in some retainer blank formats. Suffice it to say, functionally, a mechanical device or assembly to pick and place as shown (see also, e.g., FIGS. 15 & 19), or to shuttle/translate via a conveyor of the like (see e.g., FIG. 17), or a combination of approaches (FIGS. 22 & 25), may be suitably deployed in the contemplated system, as well as variants and functional equivalents.

In addition to retainer blank delivery, a dividing operation may be executed by a delivery apparatus. For example, and without limitation, an arm assembly for dispensing a retainer blank from the supply of retainer blanks may be adapted to divide the retainer blank for dispensing, and transfer the divided retainer blank to the die block of said processing station. Notionally, disparate application of tension or select tension of the retainer blank may effectuate divisions or separations about die lines of the retainer blank, as by passing the retainer blank through fingers or the like.

In connection to the contemplated processing station, it is characterized by two processes or operations, namely, retainer blank manipulation and manipulated retainer blank affixation to an ACG. Towards that end, and as has been previously noted, the processing station includes die block 70, and robotic arm 90 equipped with EOAT 80. The operative combination of the die block and the EOAT function as a die set, the EOAT adapted for mating receipt by the die block, and for securing the manipulated retainer in furtherance of affixing same to the ACG.

Die block 70, delimiting a pre-break area IA of processing station I of system 200, is fixedly supported in an elevated condition over the conveyor of the conveyance apparatus segment of the station (FIG. 2). More particularly, the die block, or die blocks as applications warrant (see FIG. 16), extend so as to be substantially coextensive with the ACGs, or a portion thereof, e.g., half of the ACGs in a two die block scenario (FIG. 16), the ACGs passable thereunder during conveyed travel. As should be appreciated, the die block is a station change part, as is the EOAT for mating with same.

Characteristic of die block 70 are channels or grooves 72 in a surface 71 thereof, at least one channel extends substantially across a length or a width dimension of the die block, or as shown, intersecting channels which bisect each of the length and width of the block commensurate with the configuration of the previously described retainer blank are provided. Notionally, die line 118 of the retainer blank are intended to substantially register with die block channels 72 for a properly received die block retainer blank. Further characteristic of the die block are selectively spaced apart "standing" structures, e.g., mandrels 74, for registered mating receipt of the through holes of second set 112 of patterned apertures of the retainer blank (see FIG. 3). During die set operation, in addition to dividing or subdividing the retainer, container engaging fingers 116 are formed/better particularized via pressed engagement of the retainer blank with the mandrels. In the case of folding clips, one or more of the retainer blank, die block and/or EAOT may be adapted to at least initiate formation of the banner portion of such clip, as by bending or creasing.

Robotic arm 90 is operable to position EOAT 80 (FIG. 4) within processing station I. While a selective compliance assembly robotic arm (SCARA) is shown and believed especially advantageous, the contemplated processing station, system and/or process is not so limited. Moreover, while the SCARA is shown in a preferred posture or orientation relative to other station and/or system elements (i.e., overhead, downward depending (−y-direction)), it likewise need not be so limited. Particulars for an advantageous robotic assembly are available in Applicant's publication WO 2017/041007, incorporated herein by reference in its entirety.

The robotic arm is advantageously but not necessarily characterized by first 92 and second 94 arm segments and three pivotable arm joints J1, J2, J3. A first arm joint J1 is a terminal/anchorable arm joint, a second arm joint J2 is an intermediate arm joint, and a third arm joint J3 is a distal arm joint for operatively supporting the EOAT. First arm segment 92 extends between J1 & J2, with second arm segment 94 extending between J2 & J3. The arm operates exclusively in two dimensions, a single plane, as SCARAs are characterized by an arm rigid in the z-axis and pliable in the x, y-axes.

In the depicted robotic arm posture, and in light of contemplated processing station operations, the EOAT is driven in the process flow direction from the pre-break area of the processing station towards a downstream ACG for registering and applying/affixing the secured divided retainer blank to the traveling ACG to thereby form at least two retained container group packs from the registered conveyed ACG (see also, e.g., FIGS. 9, 15, 19, & 25). Alternately, the EOAT may be driven in the anti-process flow direction from the pre-break area of the processing station towards a upstream ACG for registering and applying/affixing the secured divided retainer blank to the traveling ACG (see e.g., FIGS. 17 & 22). Finally, the EOAT may be driven across the process flow direction from a pre-break area of the processing station towards a passing ACG for registering and applying/affixing the secured divided retainer blank to the traveling ACG (see e.g., FIG. 11).

Referring now FIG. 4, an advantageous EOAT for registered mating with die block 70 and for operatively engaging retainer blank B received thereon is shown. EOAT 80 generally comprises a base 81 and a press plate or stamp 82 spaced apart and supported thereby. Base 81 is adapted so as to be supported by the free end of the robotic arm, and includes a vacuum port or ports 83 and vacuum conduits 84 that extend toward press plate 82 to enable the operated upon retainer blank to be secured by the EOAT for transport by the robotic arm to the target ACG. It is to be further noted that the EOAT may be equipped or otherwise adapted to include a location and/or alignment assembly to support formation of the adapted retainer blank.

Press plate 82 is adapted to, in combination with the die block, effectuate sought after retainer blank manipulations, e.g., and without limitation, dividing, scoring, bending folding, etc. As shown, the "underside" of the press plate (i.e., exposed, die block side) advantageously, but not necessarily, includes grooves or channels 85 that mimic and generally correspond to those of die block 70. Retained in press plate channels 85 are splitters 86 for engaging die lines 118 of the retainer blank so as to thereby divide or subdivide same as the case may be in furtherance of forming discrete clips. Moreover, a pattern of relief areas, e.g., connected cavities or through holes 87, are provided to receive mandrels 74 of die block 70, the retainer blank interposed therebetween.

Having initially provided an overview of contemplated processing for the formation of retained container groups from an arrayed container group via application of an adapted retainer blank to the arrayed container group, and thereafter particulars in connection to the FIG. 1 system, some final parting supplemental observations as to further non-limiting illustrative systems and system operations follow. More particularly, supplemental observations in connection to either of the system or operations of one or more of the figure depictions of the figure groupings of FIGS. 5-10, 15-27 & 30-34.

In relation to FIGS. 5-10, 15-27 & 30-34, nine illustrative, non-limiting processing stations are generally depicted FIGS. 5, 9, 15, 17, 19, 22, 25, 30 & 33. As has been previously noted, the FIG. 5-8 depictions contemplate the FIG. 1 system, with system elements broadly and generally indicated (e.g., container conveyance apparatus, blank supply, and elements of the processing station), not inconsistent with the FIG. 1 system.

Notionally, cover sheets (e.g., retainer blanks) from a supply of retainer blanks are preliminarily operated upon in advance of the application of the operated upon blank to the ACG. Advantageously, but not necessarily, the blanks are separable so as to form plural discrete pack retainers or carriers, with an ACG receiving such operated upon blank, for example, via the EOAT of the robotic assembly, thusly being subdivided into portable units or packs delimited by the discrete carriers. As has been described in connection to the FIG. 1 system, advantageously, but not necessarily, preliminary or preparatory operations may comprise, for example and without limitation, scoring, folding, cutting, disintegration, etc. at a punch/die station/substation or area of the processing station via a die set (see e.g., FIG. 2 or 3, and especially blank operations evidenced by comparison of FIGS. 28 & 29) or, more generally, via cooperative engagement of elements/structures which impart force upon an interposed retainer blank to effectuate the contemplated operations thereupon.

As is readily appreciated with reference to the referenced processing stations of FIGS. 5, 9, 15, 17, 19, 22, 25, 30 & 33, primary operations contemplated include those of manipulating a cover sheet, and applying the manipulated cover sheet to the ACG, with an ancillary system processing step generally comprising the dispensing and/or transfer of the retainer blank from a supply of retainer blanks to the die block for processing. Generally, as noted in connection to the FIG. 1 system, the cover sheet or retainer blank is dispensed from the supply of retainer blanks directly (e.g., stations of FIGS. 5, 9, 15, 17, 19), or indirectly (e.g., stations of FIGS. 22, 25, 30 & 33), to/into a forming die or the like, with direct dispensing operations advantageously but not necessarily executed via mechanical means, e.g., a picking arm or the like, characterized by a vacuum system or the like so as to secure the operated upon retainer blank in furtherance of carriage by the robotic arm to the ACG. As to the latter stations, they may be fairly characterized by a transfer apparatus/assembly, advantageously but not exclusively, in the form of a shuttle (see and compare, e.g., FIG. 17 (vertical arrangement), FIGS. 22, 25, 30 & 33 (horizontal arrangement)).

Finally, in lieu of a robotic arm or a belt drive mechanism to facilitate the formation of retained container groups from an arrayed container group via application of an adapted retainer blank to the arrayed container group, a linear motion track system (FIGS. 30-32 & FIGS. 31-33) is contemplated. A linear motion track system (e.g., iTrak from Rockwell Automation, Milwaukee, WI, USA) may be horizontally (FIG. 30) or vertically oriented (FIG. 31), and either adjacent and coextensive or over and coextensive respectively, so to effectuate transfers at least an operated upon retainer blank for affixation to an ACG.

What has been described and depicted herein are preferred, non-limiting embodiments of Applicant's subject matter, along with application contexts as the case may be. Since the elements of the methodology and/or system disclosed herein may be embodied in other specific forms without departing from the spirit or general characteristics thereof, some of which forms have been indicated, the embodiments described and depicted herein/with are to be considered in all respects illustrative and not restrictive. Moreover, while nominal operational steps or sequences and/or rubrics/protocols have been set forth, contemplated sequences/protocols are not so limited. Accordingly, the scope of the subject invention is as defined in the language of the appended claims, and includes not insubstantial equivalents thereto.

That which is claimed:

1. A method for forming retained container groups from an arrayed container group via application of an adapted retainer blank to the arrayed container group comprising the steps of:
   a. receiving a retainer blank at a pre-break area of a processing station characterized by an inflow of spaced apart arrayed container groups, the pre-break area delimited by a die block;
   b. effectuating a press stoke for an end of arm tool carried by a robotic arm so as to registeringly mate and operatively engage the die block, a received retainer blank thereby interposed between the end of arm tool and the die block;
   c. dividing the retainer blank via the press stroke so as to delimit pack carriers; and, d. applying the divided retainer blank to an arrayed container group of the spaced apart arrayed contained group in furtherance of establishing container group packs from the arrayed container group characterized by each of the pack carriers.

2. In a system for forming retained container groups from an arrayed container group via application of an adapted retainer blank to the arrayed container group, a processing station comprising:
   a. a die block for receipt of a dispensed retainer blank from a supply of retainer blanks; and,
   b. a robotic arm operable in a conveyance direction of an arrayed container group traveling upon a conveyor, said robotic arm equipable with an end of arm tool, adaptation of a retainer blank received upon the die block effectuated via engagement of the retainer blank upon the die block by said end of arm tool, the adapted retainer blank retained by said end of arm tool for travel in the conveyance direction to apply the adapted retainer blank to the arrayed container group.

3. The processing station of claim 2 wherein engagement of the retainer blank received upon said die block selectively divides the retainer blank in furtherance of forming at least two retained container group packs from the adapted retainer blank applied to the arrayed container group.

4. The processing station of claim 2 wherein engagement of the dispensed retainer blank received upon said die block selectively disintegrates the retainer blank and/or portions thereof.

5. The processing station of claim 2 wherein engagement of the retainer blank received upon said die block selectively bends portions thereof.

6. The processing station of claim 2 wherein engagement of the retainer blank received upon said die block selectively separates portions thereof.

7. The processing station of claim 2 wherein engagement of the retainer blank received upon said die block selectively breaks portions thereof.

8. The processing station of claim 2 wherein engagement of the retainer blank received upon said die block results in one or more of dividing, separating, folding and/or bending the retainer blank received upon said die block, or portions thereof.

9. The processing station of claim 2 wherein engagement of the retainer blank upon the die block by said end of arm tool divides the retainer blank in half.

10. The processing station of claim 2 wherein engagement of the retainer blank upon the die block by said end of arm tool divides the retainer blank in quarters.

11. The processing station of claim 2 wherein the adapted retainer blank is characterized by one or more of a division, a separation, a fold, and/or a bend.

12. The processing station of claim 2 wherein at least a portion of the adapted retainer blank is characterized by one or more of a division, a separation, a fold, and/or a bend.

13. The processing station of claim 2 characterized by multiple die blocks.

14. The processing station of claim 2 wherein said die block comprises die block portions.

15. The processing station of claim 2 wherein said die block overlies a portion of the conveyor upon which arrayed container groups travel.

16. The processing station of claim 2 wherein said die block is upstream of said robotic arm.

17. The processing station of claim 2 wherein said die block is downstream of said robotic arm.

18. The processing station of claim 2 wherein said end of arm tool includes a press plate having a surface adapted to divide a retainer blank via urged engagement therewith.

19. The processing station of claim 2 wherein said end of arm tool includes a press plate adapted to separate portions of an adapted retainer blank upon application of the adapted retainer blank upon the arrayed container group.

20. The processing station of claim 2 wherein said end of arm tool includes a press plate adapted to fold portions of an adapted retainer blank upon application of the adapted retainer blank upon the arrayed container group.

21. The processing station of claim 2 wherein said end of arm tool includes a press plate adapted to bend portions of an adapted retainer blank upon application of the adapted retainer blank upon the arrayed container group.

22. The processing station of claim 2 wherein said end of arm tool is adapted to include a location and/or alignment assembly to support formation of the adapted retainer blank.

23. The processing station of claim 2 wherein said robotic arm comprises a selective compliance assembly robotic arm.

24. The processing station of claim 2 wherein said robotic arm comprises a selective compliance assembly robotic arm, said selective compliance assembly robotic arm configurable to register the adapted retainer blank with an arrayed container group upstream of said die block.

25. The processing station of claim 2 wherein said robotic arm comprises a selective compliance assembly robotic arm, said selective compliance assembly robotic arm configurable to register the secured adapted retainer blank with an arrayed container group downstream of said die block.

26. The processing station of claim 2 wherein said robotic arm is operable so as to position said end of arm tool to effectuate engagement of the retainer blank upon the die block, and position the adapted retainer blank for registration with an arrayed container group traveling upon the conveyor in advance of applying the adapted retainer group to the registered arrayed container group.

27. The processing station of claim 2 wherein processing steps are continuous.

28. A system for forming retained container groups from an arrayed container group via application of an adapted retainer blank to the arrayed container group comprising multiples of the claim 2 processing station.

29. In a system for forming retained container groups from an arrayed container group via application of an adapted retainer blank to the arrayed container group, a processing station comprising:
   a. a die block for receipt of a dispensed retainer blank from a supply of retainer blanks; and,
   b. a robotic arm operable in a conveyance direction of an arrayed container group traveling upon a conveyor, said robotic arm equipable with an end of arm tool, division of a retainer blank received upon the die block effectuated via engagement of the retainer blank upon the die block by said end of arm tool, the divided retainer blank retained by said end of arm tool for travel in the conveyance direction to apply the divided retainer blank to the arrayed container group.

30. The processing station of claim 29 wherein engagement of the retainer blank received upon said die block selectively divides the retainer blank in furtherance of forming at least two retained container group packs from the divided retainer blank applied to the arrayed container group.

31. The processing station of claim 29 wherein engagement of the retainer blank upon the die block by said end of arm tool divides the retainer blank in half.

32. The processing station of claim 29 wherein engagement of the retainer blank upon the die block by said end of arm tool divides the retainer blank in quarters.

\* \* \* \* \*